US012602847B2

(12) United States Patent　　(10) Patent No.:　US 12,602,847 B2
Couleaud et al.　　(45) Date of Patent:　Apr. 14, 2026

(54) SYSTEMS AND METHODS FOR LAYERED IMAGE GENERATION

(71) Applicant: Adeia Imaging LLC, San Jose, CA (US)

(72) Inventors: Jean-Yves Couleaud, Mission Viejo, CA (US); Ning Xu, Irvine, CA (US); Zhiyun Li, Kenmore, WA (US)

(73) Assignee: Adeia Imaging LLC, San Jose, CA (US)

( * ) Notice: Subject to any disclaimer, the term of this patent is extended or adjusted under 35 U.S.C. 154(b) by 236 days.

(21) Appl. No.: 18/240,836

(22) Filed: Aug. 31, 2023

(65) Prior Publication Data

US 2025/0078346 A1　　Mar. 6, 2025

(51) Int. Cl.
　*G06T 11/60*　　(2006.01)
　*G06T 7/11*　　(2017.01)
　*G06T 7/13*　　(2017.01)
　*G06T 7/194*　　(2017.01)

(52) U.S. Cl.
　CPC ................ *G06T 11/60* (2013.01); *G06T 7/11* (2017.01); *G06T 7/13* (2017.01); *G06T 7/194* (2017.01); *G06T 2200/24* (2013.01); *G06T 2207/20081* (2013.01); *G06T 2207/20221* (2013.01)

(58) Field of Classification Search
　CPC ...................................................... G06T 11/60
　See application file for complete search history.

(56) References Cited

U.S. PATENT DOCUMENTS

| | | | |
|---|---|---|---|
| 6,804,394 | B1 | 10/2004 | Hsu |
| 11,373,390 | B2 | 6/2022 | Zhao et al. |
| 2009/0097728 | A1 | 4/2009 | Lee et al. |
| 2017/0287137 | A1 | 10/2017 | Lin et al. |
| 2019/0196698 | A1 | 6/2019 | Cohen et al. |
| 2020/0175975 | A1 | 6/2020 | Kong et al. |
| 2021/0097691 | A1 | 4/2021 | Liu |
| 2021/0383242 | A1 | 12/2021 | Ostyakov et al. |
| 2023/0026575 | A1 | 1/2023 | Faaborg et al. |

(Continued)

OTHER PUBLICATIONS

U.S. Appl. No. 18/240,837, filed Aug. 31, 2023, Jean-Yves Couleaud.

(Continued)

*Primary Examiner* — Shivang I Patel

(74) *Attorney, Agent, or Firm* — HG LAW LLP

(57)　　ABSTRACT

Systems and methods are described for generating, using the first trained machine learning model and based on text input, a single-layer image comprising a plurality of objects; generating a plurality of masks associated with the plurality of objects; determining a plurality of attributes associated with the plurality of objects; generating, using a second trained machine learning model, a plurality of textual descriptions respectively corresponding to the plurality of objects; inputting the plurality of textual descriptions, and the plurality of attributes, to the first trained machine learning model; generating, using the first trained machine learning model, a plurality of images respectively corresponding to the plurality of textual descriptions; and generating the multi-layer image by combining the plurality of images and by using the plurality of masks, wherein the plurality of images respectively correspond to a plurality of layers of the multi-layer image.

20 Claims, 14 Drawing Sheets

100 ⌐

(56) References Cited

U.S. PATENT DOCUMENTS

| | | |
|---|---|---|
| 2024/0070868 A1 | 2/2024 | Yu et al. |
| 2024/0135511 A1* | 4/2024 | Singh ........................ G06N 3/02 |
| 2024/0135611 A1* | 4/2024 | Costin ..................... G06T 11/60 |
| 2025/0077765 A1 | 3/2025 | Xu et al. |
| 2025/0078347 A1 | 3/2025 | Couleaud et al. |

OTHER PUBLICATIONS

"AbdullahAlfaraj/Auto-Photoshop-StableDiffusion-Plugin: Auto-Photoshop-StableDiffusion-Plugin," [retrieved from URL: https://github.com/AbdullahAlfaraj/Auto-Photoshop-StableDiffusion-Plugin#auto-photoshop-stablediffusion-plugin], 11 pages.

"Canny edge detector," Wikipedia, [retrieved from URL: https://en.wikipedia.org/wiki/Canny_edge_detector], 10 pages.

"ChatGPT," [retrieved from URL: https://openai.com/blog/chatgpt], 11 pages.

"DALL-E 2 can create original, realistic images and art from a text description. It can combine concepts, attributes, and styles." [retrieved from URL: https://openai.com/dall-e-2/], 9 pages (2022).

"Imagen," [retrieved from URL: https://imagen.research.google/], 18 pages.

"Layer-Divider," [retrieved from URL: https://github.com/jhj0517/stable-diffusion-webui-Layer-Divider ], 4 pages.

"Openai / CLIP: CLIP (Contrastive Language-Image Pretraining), Predict the most relevant text snippet given an image,"[retrieved from URL: https://github.com/openai/CLIP], 7 pages.

"Stable Diffusion Launch Announcement," [retrieved from URL: https://stability.ai/blog/stable-diffusion-announcement ], 4 pages (Aug. 10, 2023).

"Xuebinquin / DIS: This is the repo for our new project Highly Accurate Dichotomous Image Segmentation," [retrieved from URL: https://github.com/xuebinqin/DIS ], 15 pages.

Li, K., et al., "Guided Attention Inference Network," IEEE Transactions on Pattern Analysis and Machine Intelligence, 15 pages (2019).

Cheng, J., et al., "LayoutDiffuse: Adapting Foundation Diffusion Models for Layout-to-Image Generation," [retrieved from URL: LayoutDiffuse: https://arxiv.org/pdf/2302.08908.pdf], 15 pages (Feb. 16, 2023).

Herrera, J. L., et al., "Automatic Depth Extraction from 2D Images Using a Cluster-Based Learning Framework," IEEE Transactions on Image Processing, 27(7):3288-3299 (2018).

Ramesh, A., et al. "Hierarchical text-conditional image generation with clip latents," [retrieved from URL: arXiv preprint arXiv:2204.06125], 27 pages (2022).

Reed, S., et al., "Generative Adversarial Text-to-Image Synthesis," Proceedings of the 33rd International Conference of Machine Learning, New York, NY, USA, 2016.

Rombach, R., et al. "High-resolution image synthesis with latent diffusion models." Proceedings of the IEEE/CVF Conference on Computer Vision and Pattern Recognition, 45 pages (2022).

Saharia, C., et al. "Photorealistic text-to-image diffusion models with deep language understanding," 46 pages (2022).

Yang, J., et al., "LR-GAN: Layered Recursive Generative Adversarial Networks for Image Generation," ICLR, [retrieved from URL: https://openreview.net/pdf?id=HJ1kmv9xx], 21 pages (Aug. 5, 2017).

Zhang, H., et al., "StackGAN: Text to Photo-realistic Image Synthesis with Stacked Generative Adversarial Networks," Computer Science > Computer Vision and Pattern Recognition, 14 pages (2016).

Zheng, H., et al., "Image Inpainting with Cascaded Modulation GAN and Object-Aware Training," [retrieved from URL: https://arxiv.org/pdf/2203.11947v3.pdf], 32 pages (2022).

Zou, X., et al., "Segment Everything Everywhere All at Once," [retrieved from URL: https://arxiv.org/pdf/2304.06718.pdf ], 13 pages (Jul. 11, 2023).

U.S. Appl. No. 18/240,054.

* cited by examiner

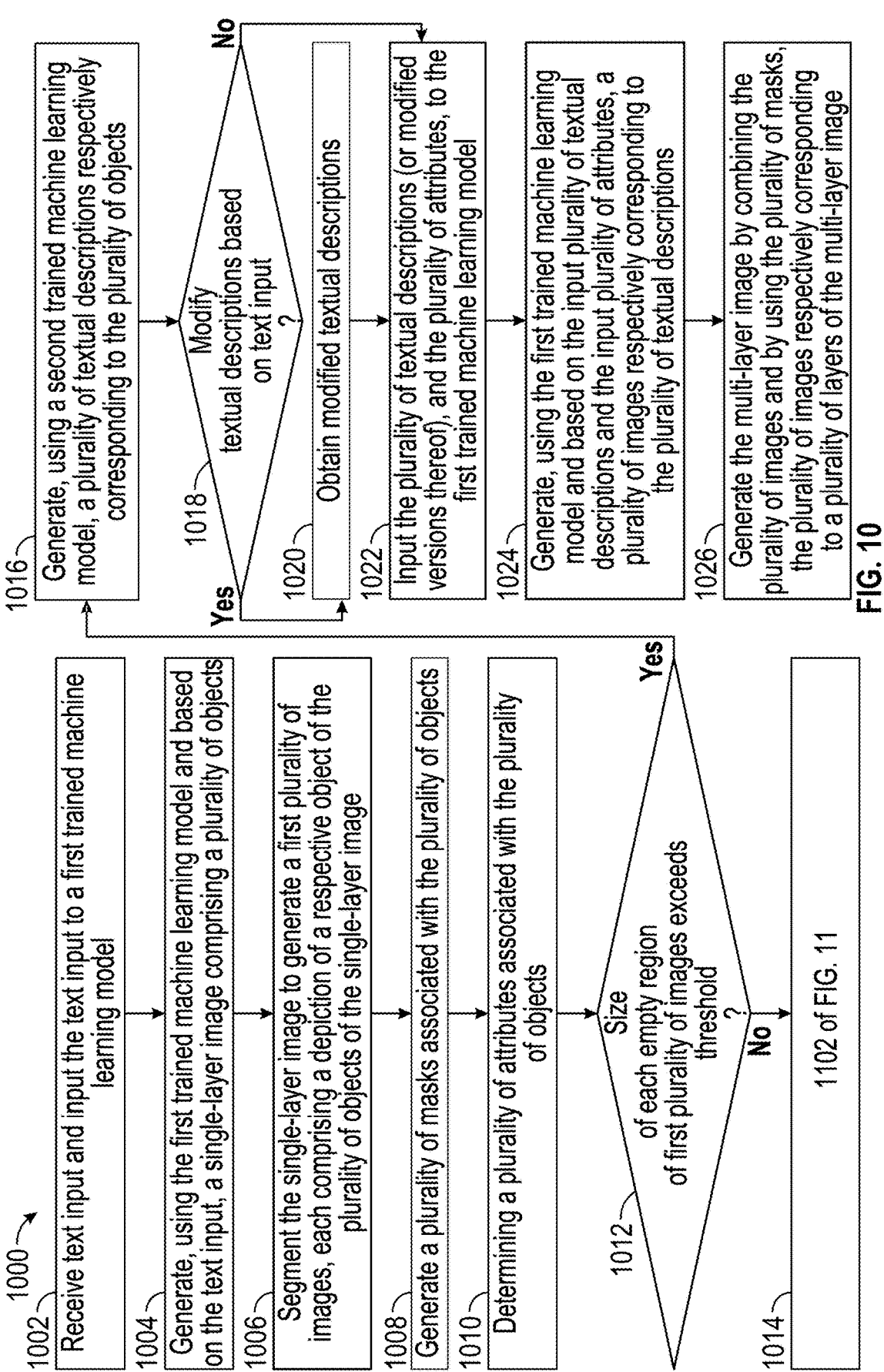

1002 — Receive text input and input the text input to a first trained machine learning model 1004 — Generate, using the first trained machine learning model and based on the text input, a single-layer image comprising a plurality of objects 1006 — Segment the single-layer image to generate a first plurality of images, each comprising a depiction of a respective object of the plurality of objects of the single-layer image 1008 — Generate a plurality of masks associated with the plurality of objects 1010 — Determining a plurality of attributes associated with the plurality of objects 1012 — Size of each empty region of first plurality of images exceeds threshold ?

No → 1014 — 1102 of FIG. 11

Yes →

1016 — Generate, using a second trained machine learning model, a plurality of textual descriptions respectively corresponding to the plurality of objects 1018 — Modify textual descriptions based on text input ?

No →

Yes →

1020 — Obtain modified textual descriptions

1022 — Input the plurality of textual descriptions (or modified versions thereof), and the plurality of attributes, to the first trained machine learning model 1024 — Generate, using the first trained machine learning model and based on the input plurality of textual descriptions and the input plurality of attributes, a plurality of images respectively corresponding to the plurality of textual descriptions 1026 — Generate the multi-layer image by combining the plurality of images and by using the plurality of masks, the plurality of images respectively corresponding to a plurality of layers of the multi-layer image

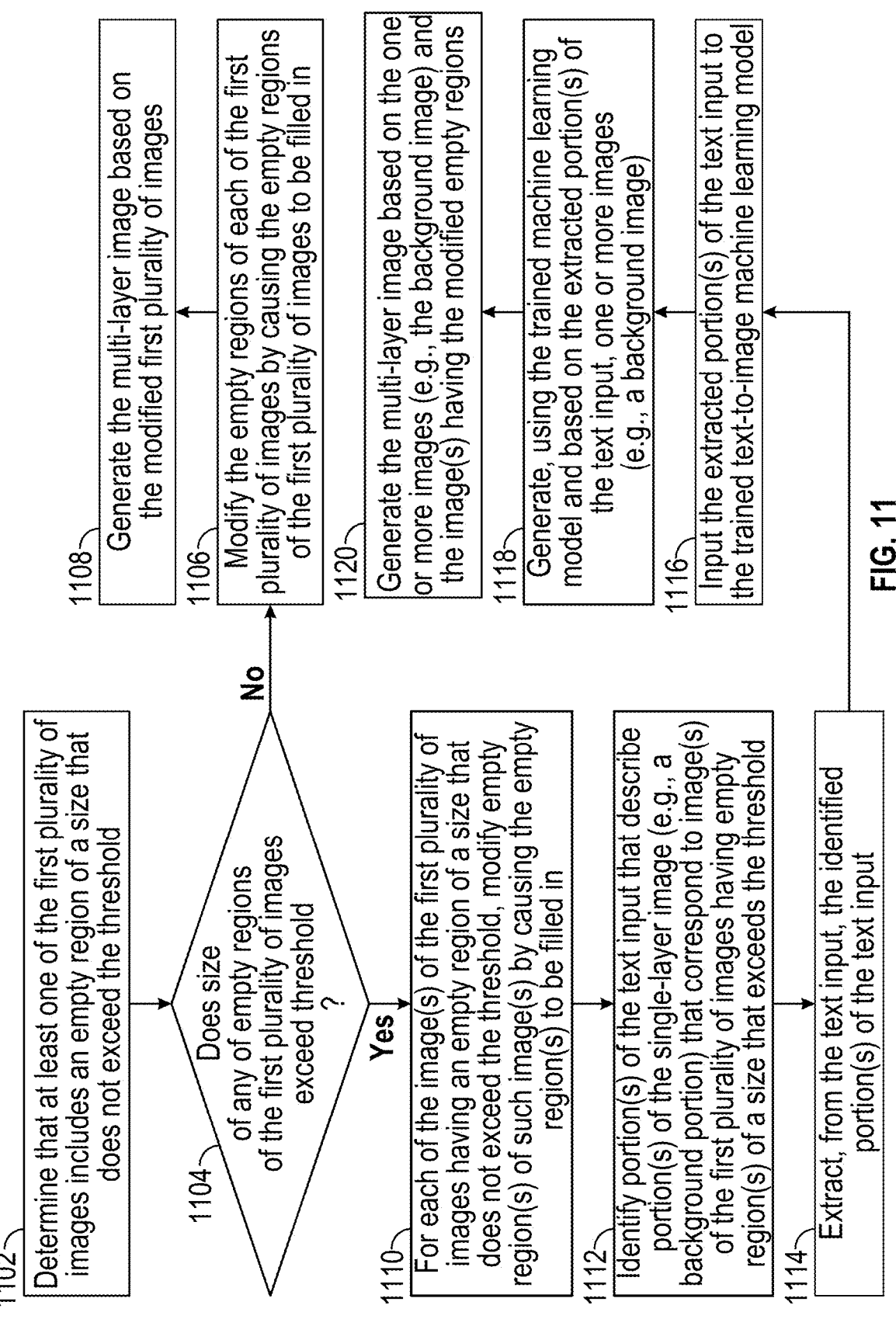

FIG. 11

1102 — Determine that at least one of the first plurality of images includes an empty region of a size that does not exceed the threshold 1104 — Does size of any of empty regions of the first plurality of images exceed threshold?

No

Yes

1108 — Generate the multi-layer image based on the modified first plurality of images 1106 — Modify the empty regions of each of the first plurality of images by causing the empty regions of the first plurality of images to be filled in 1120 — Generate the multi-layer image based on the one or more images (e.g., the background image) and the image(s) having the modified empty regions 1118 — Generate, using the trained machine learning model and based on the extracted portion(s) of the text input, one or more images (e.g., a background image)

1116 — Input the extracted portion(s) of the text input to the trained text-to-image machine learning model 1110 — For each of the image(s) of the first plurality of images having an empty region of a size that does not exceed the threshold, modify empty region(s) of such image(s) by causing the empty region(s) to be filled in 1112 — Identify portion(s) of the text input that describe portion(s) of the single-layer image (e.g., a background portion) that correspond to image(s) of the first plurality of images having empty region(s) of a size that exceeds the threshold 1114 — Extract, from the text input, the identified portion(s) of the text input

SYSTEMS AND METHODS FOR LAYERED IMAGE GENERATION

BACKGROUND

This disclosure is directed to systems and methods for generating multi-layer images. More particularly, techniques are disclosed for using one or more machine learning models to convert input text to an output image, and to perform regeneration of (and/or other modification of) one or more portions of such image to generate the multi-layer images.

SUMMARY

Text-to-image models are types of neural networks that generate images based on a text prompt, such as a sentence or a paragraph describing the desired image to be generated. Such models have recently been incorporated in new, popular tools for users to generate images based on a text input. These models have been the focus of significant research in recent years, with many different architectures and training methods proposed. In one approach, a text-to-photo synthesis model uses a combination of a text encoder and a generative neural network to generate images from textual descriptions. In another approach, in a first-stage, a text encoder is used to generate a low-resolution image and in a second stage, a conditional generative adversarial network is used to generate a high-resolution image. In another approach, a guided attention mechanism selectively attends to different regions of the text in order to generate images that match the textual description more closely. In yet another approach, a two-stage model includes a first stage that generates an image embedding given a text caption, and a diffusion-based decoder at the second stage generates an image conditioned on the image embedding from the first stage.

However, the models of such approaches generate a flat image (e.g., an image with only one layer) that may need to be segmented afterwards to be included in content production workflows. Layered images are images that are composed of multiple images organized in layers, and opacity from one layer to the other is managed using an alpha channel of each layer.

Layered images are important to content creators, as they are the foundation for image compositing. Without layers, images are monolithic and need to be edited as a whole all the time. With layers, image work can be divided among artists or can be split into different tasks such as working on the background, the characters or overlay text. However, while the models of such aforementioned approaches may be trained with billions of images, the models of the aforementioned approaches are not generally trained on alpha-channel images, and merely interpret transparent pixels as solid colors of black or white.

In another approach, large language models can be used to extract object and layer information from a prompt, for use as a guide in a text-to-image generation. However, using the results of these queries to generate a set of images directly by inputting the resulting prompts into a text-to-image generation model would lead to undesirable results, since each prompt would be considered independent from the others, and the resulting layers would not convey a sense of consistency when assembled. Moreover, since in such approach the text-to-image model does not generate transparency, assembling in layers a set of images generated with these models (e.g., without further editing) would result in only the top layer being visible.

To address these problems, systems, methods, and apparatuses are disclosed herein for generating a multi-layer image based on text input by receiving the text input and inputting the text input to a first trained machine learning model; generating, using the first trained machine learning model and based on the text input, a single-layer image comprising a plurality of objects; generating a plurality of masks associated with the plurality of objects; determining a plurality of attributes associated with the plurality of objects; generating, using a second trained machine learning model, a plurality of textual descriptions respectively corresponding to the plurality of objects; inputting the plurality of textual descriptions, and the plurality of attributes, to the first trained machine learning model; generating, using the first trained machine learning model and based on the plurality of textual descriptions and the plurality of attributes, a plurality of images respectively corresponding to the plurality of textual descriptions; and generating the multi-layer image by combining the plurality of images and by using the plurality of masks, wherein the plurality of images respectively correspond to a plurality of layers of the multi-layer image. For instance, an original prompt may be "a picture of a young woman holding a kitten in front of a Victorian era building, 1870, high quality, soft focus, f/18, 60 mm, in the style of Auguste Renoir," and the process may generate three layers: one for the young woman, one for the kitten and one for the building, for inclusion in a multi-layer image.

In addition, to address these problems, systems, methods, and apparatuses are disclosed herein for generating a multi-layer image based on text input by receiving the text input and inputting the text input to a trained machine learning model and generating, using the trained machine learning model and based on the text input, a single-layer image comprising a plurality of objects. The single-layer image is segmented to generate a plurality of images, each image of the plurality of images comprising a depiction of a respective object of the plurality of objects of the single-layer image. A portion of the text input describing or relating to a background portion of the single-layer image is extracted from the text input and the extracted portion of the text input is then input into the trained machine learning model. A background image is generated, using the trained machine learning model and based on the extracted portion of the text input and the multi-layer image is generated based on the plurality of images and the background image. For instance, an original prompt may be "a picture of a young woman holding a kitten in front of a Victorian era building, 1870, high quality, soft focus, f/18, 60 mm, in the style of Auguste Renoir," and the process may generate three layers: one for the young woman, one for the kitten and one for the building, for inclusion in a multi-layer image.

Such aspects disclosed herein enable leveraging generative artificial intelligence (AI) models to guide the generation of images to be used as layers in a multi-layer image based on the characteristics of an initial image, to ensure consistency between boundaries (and/or other attributes) of objects or portions of the initial single-layer image and boundaries (and/or other attributes) of the objects or portions of the output multi-layer image. For example, the techniques described herein may generate interdependencies that may be used to obtain a multi-layer image corresponding to an initially generated single-layer image. In addition, such aspects disclosed herein may enable automatically generating the multi-layer image based on text input, without requiring editing of image layers by the user, and without having to generate a machine learning model that is capable of handling transparency of layers or taking into account alpha channel information, thereby conserving computational (e.g., processing and memory) and networking resources required to train such a model. Indeed, since alpha-channel images are not generally available in a sufficient number, the techniques described herein may improve efficiency by avoiding the cost-prohibitive task of training a model using a new synthetic set obtained by segmenting non-alpha-channel images.

In some embodiments, the second machine learning model comprises an image-to-text machine learning model, the plurality of images comprise a second plurality of images, and the systems, methods, and apparatuses described herein further comprise inputting the first plurality of images to the second trained machine learning model, to generate the plurality of textual descriptions respectively corresponding to the plurality of objects.

In some embodiments, the systems, methods, and apparatuses described herein may be further configured to determine that, as a result of the segmenting, each respective image of the first plurality of images comprises at least one empty region at a portion of the respective image at which one or more objects of the plurality of objects is depicted in the single-layer image. A mask for each respective empty region of the empty regions of the plurality of images may be generated to obtain the plurality of masks associated with the plurality of objects. Such masks may be used to segment, and add transparency to one or more portions of, the second plurality of images, wherein the multi-layer image is generated based at least in part on the segmented second plurality of images.

In some embodiments, determining the plurality of attributes associated with the plurality of objects comprises detecting, for each image of the first plurality of images, edges of one or more objects in the image. In some embodiments, inputting the plurality of textual descriptions to the first trained machine learning model comprises, for each image of the first plurality of images, inputting to the first trained machine learning model information indicative of the detected edges of the one or more objects in the image along with the corresponding textual description of the plurality of textual descriptions. In some embodiments, the generating of the second plurality of images using the first trained machine learning model is guided by the information indicative of the detected edges, e.g., to ensure consistency between the objects or other portions of the single layer image and the multi-layer image.

In some embodiments, the systems, methods, and apparatuses described herein may be further configured to, prior to inputting the first plurality of images to the second trained machine learning model, modify a shape or a size of one or more empty regions of the at least one empty region.

In some embodiments, the systems, methods, and apparatuses described herein may be further configured to determine that a size of at the least one empty region does not exceed a threshold; and in response to determining that the size of each empty region exceeds the threshold, performing: the generating of the plurality of textual descriptions respectively corresponding to the plurality of objects; the inputting of the plurality of textual descriptions to the first trained machine learning model; and the generating of the plurality of images respectively corresponding to the plurality of textual descriptions.

In some embodiments, the plurality of textual descriptions comprise a second plurality of textual descriptions, and generating, using the second trained machine learning model, the second plurality of textual descriptions respectively corresponding to the plurality of objects further comprises generating, using the second trained machine learning model, a first plurality of textual descriptions, based on the second trained machine learning model receiving input of the first plurality of images, and modifying the first plurality of textual descriptions based on the text input to generate the second plurality of textual descriptions.

In some embodiments, the second machine learning model comprises a large language model (LLM), and generating, using the second trained machine learning model, the plurality of textual descriptions respectively corresponding to the plurality of objects comprises: inputting the text input to the second trained machine learning model, and generating, using the second trained machine learning model and based on the text input, the plurality of textual descriptions.

In some embodiments, the systems, methods, and apparatuses described herein may be further configured to generate a depth map for the single-layer image, wherein generating the multi-layer image by combining the plurality of images further comprises ordering the plurality of images, respectively corresponding to the plurality of layers of the multi-layer image, based on the depth map.

In some embodiments, the systems, methods, and apparatuses described herein may be further configured to receive input of a particular image, wherein the particular image is included as an object of the plurality of objects in the generated single-layer image based on the received input of the particular image; generate, for display at a graphical user interface, the multi-layer image, wherein the graphical user interface comprises one or more options to modify the multi-layer image; receive selection of the one or more options; and modify the multi-layer image based on the received selection.

In some embodiments, the systems, methods, and apparatuses described herein may be further configured to generate a plurality of variations of the multi-layer image based on the plurality of images.

In some embodiments, the plurality of variations comprises a first variation and a second variation, and one or more of a size, location, or appearance of a first object of the plurality of objects in the first variation is different from at least one of a size, location, or appearance of the first object in the second variation.

In some embodiments, the systems, methods, and apparatuses described herein may be further configured to modify the empty regions by causing the empty regions to be filled in, wherein generating the multi-layer image is based on the plurality of images, having the at least one modified empty region, and the background image.

In some embodiments, the systems, methods, and apparatuses described herein may be further configured to determine whether a size the at least one empty region does not exceed a threshold, and, in response to determining that the size of the at least one empty region does not exceed the threshold, performing the modifying of the at least one empty region.

In some embodiments, modifying the at least one empty region by causing the at least one empty region to be filled in comprises performing inpainting of the at least one empty region.

In some embodiments, the extracting and the generating the background image are performed in response to determining that an image of the plurality of images corresponding to a background portion of the single-layer image comprises an empty region of a size that exceeds a threshold.

In some embodiments, the systems, methods, and apparatuses described herein may be further configured to generate a mask for each respective empty region of the empty regions of the plurality of images to obtain a plurality of masks, and using the plurality of masks to modify a plurality of empty regions.

In some embodiments, the systems, methods, and apparatuses described herein may be further configured to determine that a size of an empty region of a first image of the plurality of images exceeds a threshold, wherein the first image corresponds to the background portion of the single-layer image, and determine that a size of an empty region of a second image of the plurality of images does not exceed the threshold. In response to determining that the size of the empty region of the first image exceeds the threshold, the first image may be regenerated by inputting the extracted portion of the text input to the trained machine learning model. In response to determining that the size of the empty region of the second image does not exceed the threshold, the empty region of the second image may modified by being filled in (e.g., using inpainting).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 10 is a flowchart of a detailed illustrative process for generating a multi-layer image, in accordance with some embodiments of this disclosure.

FIG. 11 is a flowchart of a detailed illustrative process for generating a multi-layer image, in accordance with some embodiments of this disclosure.

DETAILED DESCRIPTION

Figure 1:
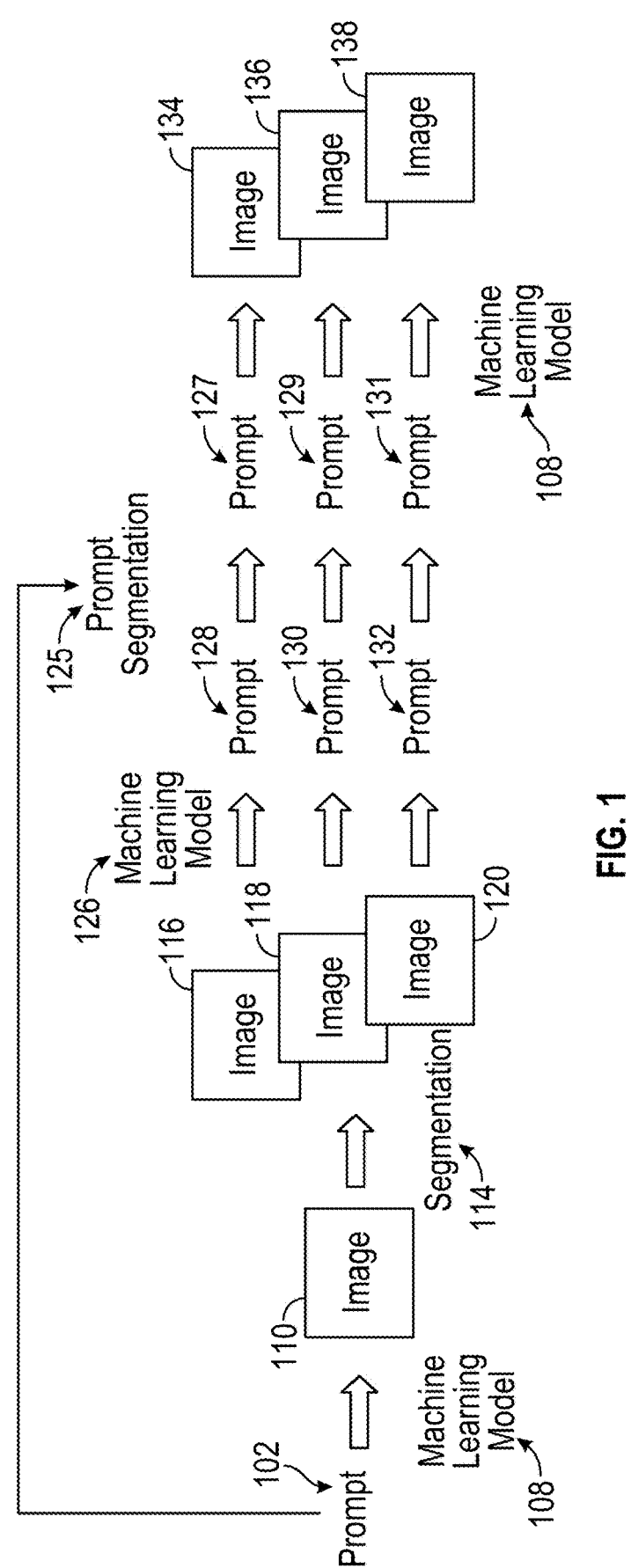
FIGS. 1-2 show illustrative block diagrams for generating a multi-layer image, in accordance with some embodiments of this disclosure.
Figure 2:
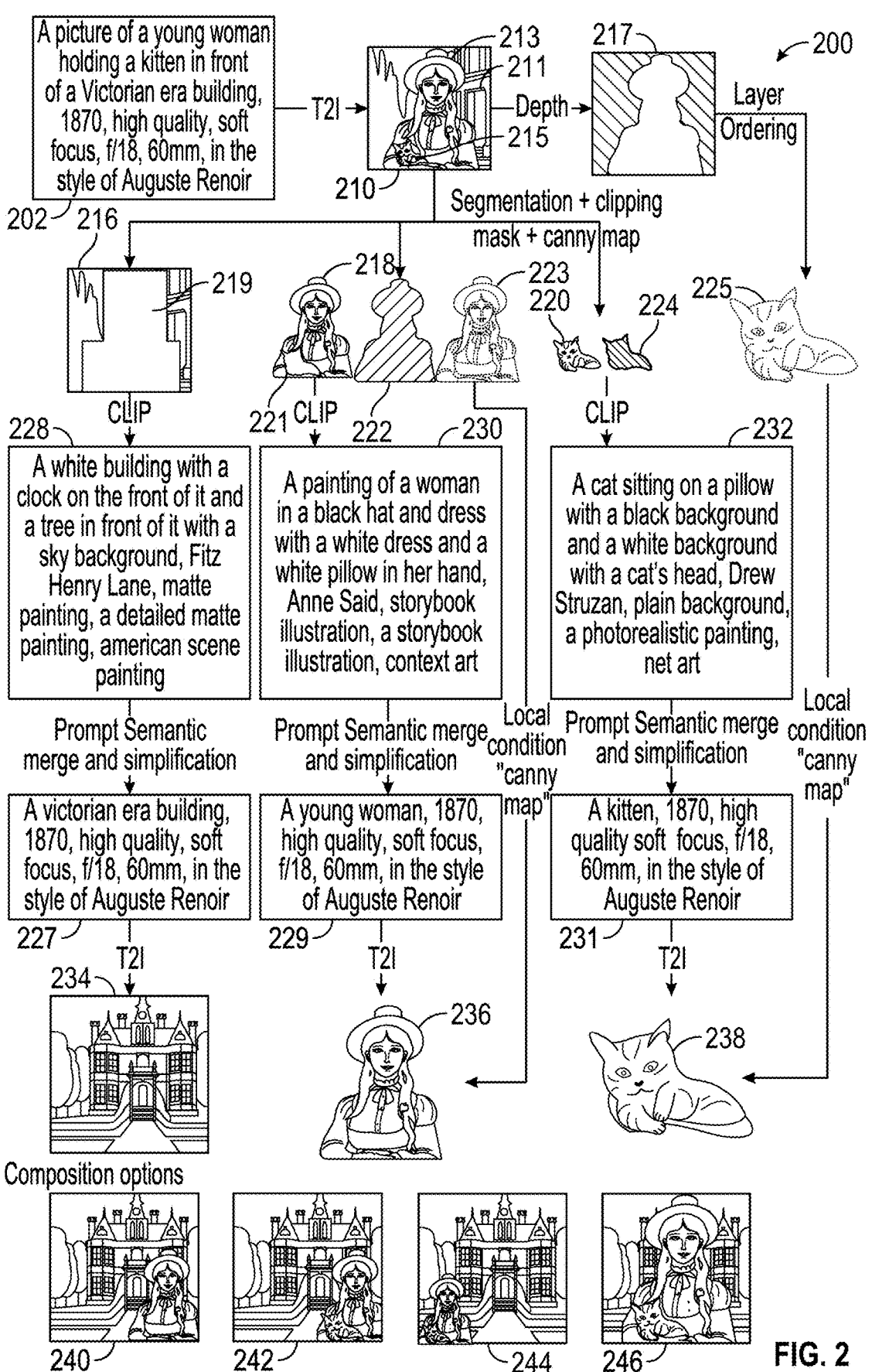

FIGS. 1-2 show illustrative block diagrams 100 and 200, respectively, for generating a multi-layer image, in accordance with some embodiments of this disclosure. An image processing application may be configured to perform the functionalities (or one or more portions thereof) described therein. The image processing application may be executing at least in part at a computing device (e.g., computing device 800 or 801 of FIG. 8) and/or at one or more remote servers (e.g., media content source 902 and/or server 904 of FIG. 9) and/or at any other suitable computing device(s). The image processing application may be configured to perform functionalities described herein. The image processing application may correspond to or be included as part of an image processing system, which may be configured to perform the functionalities (or one or more portions thereof) described herein. In some embodiments, the image processing system may comprise or be incorporated as part of any suitable application or software. For example, the image processing system may comprise: one or more extended reality (XR) applications; one or more video or image or electronic communication applications; one or more social networking applications; one or more image or video capturing and/or editing applications; one or more image, video and/or textual acquisition, recognition and/or processing applications; one or more content creation applications; one or more machine learning models or artificial intelligence models; one or more streaming media applications; or any other suitable application(s); and/or may comprise or employ any suitable number of displays; sensors or devices such as those described in FIGS. 1-11; or any other suitable software and/or hardware components; or any combination thereof.

In some embodiments, the image processing application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

In some embodiments, the image processing system may be configured to generate layered images from text input. For example, the image processing system may receive, as shown in FIG. 1, input of a text prompt 102. Such input may be received at a user interface of a computing device from a user in any suitable form (e.g., tactile or touch input; a mouse click; selection of a UI or hardware button or option; voice input; biometric input; input received via a keyboard or remote control; or any other suitable input; or any combination thereof). In some embodiments, the input may be machine-generated input.

As a non-limiting illustrative example, as shown in FIG. 2, text prompt 102 may correspond to text prompt 202 of FIG. 2 of "a picture of a young woman holding a cat in front of a Victorian era building, 1870, high quality, soft focus, f/18, 60 mm, in the style of Auguste Renoir." In some embodiments, text prompt 102 may be provided as an input to a first trained machine learning model (e.g., text-to-image model 108 of FIG. 1). In some embodiments, the image processing system may receive input from the user indicating one or more parameters for machine learning model 108, such as, for example, a choice of sampler (e.g., an Euler sampler, a Heun sampler, a DPM (diffusion probabilistic model) Fast sampler, a DPM2 sampler, or any other suitable sampler, or any combination thereof); a number of iterations (e.g., to obtain a stable picture, meaning that the picture or image obtained after N iterations does not significantly differ from the picture obtained in the previous iteration); an attention factor (e.g., a level of attention the model gives to each of the words in text prompt 102); or any other suitable parameter(s), or any combination thereof.

Based on input prompt 102, model 108 may be configured to output image 110 (e.g., representing an interpretation of text input 202, as determined by model 108), which may correspond to first image 210 of FIG. 2. In some embodiments, image 110 may be a single-layer image. As shown in FIG. 2, image 210 may comprise a plurality of objects, e.g., building 211, woman 213, and cat 215. As referred to herein, the term "object" should be understood to refer to any person, character, avatar, structure, landmark, landscape, terrain, animal, item, thing, location, place, or any portion or component thereof, any suitable portion of the natural world or an environment, or any other suitable observable entity or attribute thereof visually depicted in an image or video. For example, if an image depicts a sky or skyline, the sky or skyline may correspond to an object, and/or portions thereof (e.g., one or more clouds) may correspond to an object. In some embodiments, the image processing system may generate a depth map 217 of first image 210 extracted from image 210 and defining a depth for each of the pixels of first image 210, using any suitable computer-implemented technique (e.g., machine learning, such as, for example, a convolutional neural network (CNN)). In some embodiments, the image processing system may generate a depth map 217 based at least in part on the techniques described in Herrera et al. "Automatic Depth Extraction from 2D Images Using a Cluster-Based Learning Framework," in IEEE Transactions on Image Processing, vol. 27, no. 7, pp. 3288-3299, July 2018, the contents of which is hereby incorporated by reference herein in its entirety.

In some embodiments, image 110 (and/or subsequent images generated by the techniques described herein) may be a photo; a picture; a still image; a live photo; a video; a movie; a media asset; a recording; a slow motion video; a panorama photo, a GIF, burst mode images; images from another type of mode; or any other suitable image; or any combination thereof.

As shown in FIG. 1, the image processing system may perform segmentation 114 of image 110 to obtain images 116, 118, and 120 (e.g., different identified portions, segments, and/or objects of image 210 of FIG. 2), which may respectively correspond to images 216, 218, and 220. Images 216, 218, and 220 may each comprise a depiction of a respective object of the plurality of objects 211, 213 and 215 of image 210. For example, image 216 may comprise a depiction of building 211 of image 210, image 218 may comprise a depiction of woman 213 of image 210, and image 220 may comprise a depiction of cat 215 of image 210. In some embodiments, the image processing system may perform image segmentation 114 (e.g., semantic segmentation and/or instance segmentation) on image 210 to identify, localize, distinguish, and/or extract the different objects, and/or different types or classes of the objects, or portions thereof, of image 210. For example, such segmentation techniques may include determining which pixels in image 210 belong to a depiction of building 211, which pixels in image 210 belong to a depiction of woman 213, which pixels in image 210 belong to a depiction of cat 215, and/or which pixels of image 210 belong to a background or physical environment surrounding the objects, or otherwise do not belong to building 211, woman 213, or cat 215.

Any suitable number or types of techniques may be used to perform such segmentation, such as, for example: machine learning; computer vision; object recognition; pattern recognition; facial recognition; image processing; image segmentation; edge detection; color pattern recognition; partial linear filtering, regression algorithms; and/or neural network pattern recognition; or any other suitable technique; or any combination thereof. In some embodiments, objects may be identified by extracting one or more features for a particular object, and comparing the extracted features to those stored locally and/or at a database or server storing features of objects and corresponding classifications of known objects. In some embodiments, image segmentation 114 may comprise at least in part performing a conversion of image 210 (e.g., a color RGB image) to a grayscale image, and/or using a thresholding technique to convert pixels values above or below a threshold (e.g., between 0 and 255) to a first pixel value (e.g., 1) and the other pixels to a second pixel value (e.g., zero), to identify distinct objects in the image.

As shown in FIG. 2, the image processing system may generate, for one or more of images 216, 218 and 220 respectively associated with objects 211, 213 and 215, respective clipping masks. In some embodiments, such clipping masks may be generated based on, in parallel with, or as an output of, the image segmentation. In some embodiments, the clipping masks may be usable to extract objects 211, 213, and 215 from image 210, to obtain images 216, 218 and 220. In some embodiments, the clipping masks may comprise a vector comprising any suitable number of dimensions, e.g., specifying pixel value information and/or encoding information regarding a depth of the object. In some embodiments, the mask may be a bitmap in which a first value (e.g., "0") indicates that a pixel is outside the mask and a second value (e.g., "1") indicates that a pixel is part of the mask. In some embodiments, a dithered mask may be employed for shadows having a value for the alpha channel. In some embodiments, the image processing system may generate clipping mask 222 associated with image 218 and object 213, and the image processing system may generate clipping mask 224 associated with image 220 and object 215. Clipping masks 222 and 224 may be configured to outline the shapes of the respective objects 213 and 215 in image 210, and/or hide other portions of image 210. In some embodiments, clipping masks 222 and 224 may be binary masks, and/or may define the boundaries of a particular object. In some embodiments, clipping masks 222 and 224 may be used to refine the results of the image segmentation 114.

In some embodiments, segmentation 114 and/or generation of the clipping masks may be performed at least in part based on performing semantic segmentation of text prompt 102, and based on performing object recognition, to ensure consistency between text prompt 102 and the generated object images 216, 218 and 220. For example, if text prompt 102 corresponds to or comprises the text "a woman standing in front of a group of men," the image processing system may segment the resulting image 110 into two objects, the first object being the depiction of the woman, and the second object being the depiction of the group of men, and may decline to split the group of men into multiple individual objects.

In some embodiments, for each of image 216, 218, and 220, the corresponding object (e.g., 211, 213, and 215, respectively) represented in the image may be a pixel copy of object 211, 213, or 215 in image 210, and the remainder of generated image 216, 218 and/or 220 may comprise partially or fully transparent pixels (e.g., having their alpha channel component set to 0). In some embodiments, the image processing system may perform the segmentation based at least in part on the techniques discussed in Qin et al. "Highly Accurate Dichotomous Image Segmentation,"

Computer Vision: ECCV 2022. ECCV 2022. Lecture Notes in Computer Science, vol 13678, and Zou et al. "Segment Everything Everywhere All at Once," arXiv preprint arXiv: 2304.06718 (2023) the contents of which is hereby incorporated by reference herein in its entirety.

In some embodiments, based on text input 202 and/or image 210, the image processing system perform segmentation 114 to generate a plurality of layers, e.g., a layer for building 211, a layer from woman 213 and a layer for cat 215. In some embodiments, images 216, 218 and 220 (respectively associated with building 211, woman 213, and cat 215) may be ordered by foreground to background, e.g., at least in part using the extracted depth map 217 or an equivalent artifact. For example, the cat object in image 220 may be assigned the highest priority in the layer ordering, the woman depicted in image 218 may be assigned an intermediate priority in the layer ordering, and the building object depicted in image 216 may be assigned the lowest priority in the layer ordering. In some embodiments, specific portions in an image or objects in an image to be considered layers in the context of an image may vary depending on the context, purpose or other attributes of the image.

As shown in FIG. 2, as a result of the segmenting, one or more of images 216, 218 and 220 (e.g., images 216 and 218) may comprise at least one empty region (e.g., a hole) at a portion of the respective image at which one or more objects are depicted in image 210. For example, image 216 may comprise empty region or hole 219 corresponding to a location where woman 211 (and cat 215) is present in image 210 (e.g., prior to being segmented out in image 216), and image 218 may comprise empty region or hole 221 corresponding to a location where cat 215 is present in image 210 (e.g., prior to being segmented out in image 218). In some embodiments, the outline of each of holes 219 and 221 may be recorded as clipping masks for subsequent use in the techniques described herein.

In some embodiments, the image processing system may determine a plurality of attributes associated with the plurality of objects, e.g., building 211, woman 213, and cat 215. For example, the image processing system may detect, for each of image 216, 218, and 220, (e.g., corresponding to objects 211, 213, and 215, respectively), edges of the corresponding object using any suitable technique. As an example, the image processing system may employ a canny edge detection algorithm (and/or any other suitable algorithm) to generate canny edge map 223 (or another suitable representation or map) associated with object 213 and image 218 and canny edge map 225 (associated with object 215 and image 220), based on the detected edges of object 213 and 215. In some embodiments, the canny edge map may be a low resolution canny edge map. In some embodiments, edge detection techniques may be used to determine boundaries (e.g., edges, shape outline, border) of one or more objects in the image, and/or to pixel values of portions of the image surrounding the one or more objects, e.g., the image processing system may determine, based on detecting that brightness values or intensities of adjacent pixels abruptly change, an edge of an object.

In some embodiments, as shown in FIG. 1, images 116, 118 and 120 may be input (e.g., sequentially or in parallel) to trained machine learning model 126 (e.g., an image-to-text machine learning model). In some embodiments, machine learning model 126 may comprise a contrastive language-image pretraining (CLIP) model. Model 126 may generate a set of textual prompts 128, 130, and 132 corresponding to (e.g., describing or interpreting) the plurality of images 116, 118 and 120, receptively (which in turn may depict or represent objects 211, 213 and 215 of FIG. 2). In some embodiments, textual prompts 128, 130, and 132 of FIG. 1 may respectively correspond to textual prompts 228, 230 and 232 of FIG. 2. In some embodiments, textual prompts 127, 129, and 131 of FIG. 1 may correspond to textual prompts 227, 229, and 231 of FIG. 2. In some embodiments, textual prompts 228, 230 and 232 of FIG. 2 may correspond to objects 211, 213, and 215, respectively, and/or images 216, 218, and 220, respectively.

In some embodiments, the image processing system may be configured to perform prompt segmentation 125 (e.g., using a large language model) of textual prompts 128, 130, and 132. For example, textual prompts 128, 130, and 132 may be compared to or reconciled with text input 102, to check whether any of textual prompts 128, 130, and 132 should be updated with information from text input 102 that may be relevant to the corresponding extracted object. For example, such updating may comprise updating textual prompts 228, 230 and 232 to textual prompts 227, 229 and 231, respectively. In some embodiments, a machine learning model used at 125 may comprise a trained large language model (LLM), configured to receive as input text prompt 102 and to generate and output textual prompts 127, 129, and 131, which may each include a reference to an object individually as well as style guidance, e.g., generate textual prompts 128, 130, and 132 in "one shot."

In some embodiments, such as, for example, where machine learning model 126 corresponds to a trained image-to-text machine learning model, to avoid confusing machine learning model 126 with holes 219 and 221 being present in input images 216 and 218, it may be desirable for the image processing system to perform additional cropping of regions of interest, and/or expansion or other modification of corresponding clipping mask(s), resulting in a set of images that represent the same object.

In some embodiments, one or more of holes or empty regions 219 or 221 may be filled, prior to inputting images 216 and 218 to machine learning model 126. In some embodiments, where hole or empty region 219 associated with image 216 comprises one or more other holes (e.g., a hole corresponding to the extracted woman 218 and extracted cat 220), such holes may be filled depending on the priority of the layer. For example, clipping mask 222, associated with the depiction of woman 213 and image 218, may also include the area or hole 221 where the cat 215 was extracted. In some embodiments, it may be desirable to preprocess images 216, 218 and/or 220 prior to inputting such images to trained machine learning model 126. For example, the image processing system may extend and/or reshape (e.g., in rectangular areas) one or more of holes 219, 221, as a preprocessing step prior to inputting images 216 and 218 to trained machine learning model 126. As another example, the image processing system may perform upscaling to help maximize object resolution. For example, if image 210 has dimensions of 512×512, and if image 220 of cat 215 has dimensions of 90×40, in order to maximize resolution of the resulting layers to be subsequently obtained, image 220 of cat 215 may be upscaled to the native resolution of the model used.

As shown in FIG. 2, the new series of textual prompts 228, 230, and 232 generated by trained machine learning model 126 may, because input images 216, 218, and 220 resulted from segmentation of image 210, each comprise a unique object subject, a series of descriptive elements and a set of style qualifiers. In some embodiments, the image processing system may perform a semantic comparison between textual prompt 202 and textual prompts 228, 230, and 232, to determine whether to replace portion(s) in one or more of textual prompts 228, 230, and 232 with portion(s) of textual prompt 202. For example, it may be desirable to replace style qualifier(s) of one or more of textual prompts 228, 230, and 232 with style qualifier(s) of textual prompt 202, and/or to determine whether descriptive element(s) of one or more of textual prompts 228, 230, and 232 are consistent with descriptive element(s) of textual prompt 202. Any suitable computer-implemented technique may be used to perform such determinations. In some embodiments, a machine learning model, such as, for example, an LLM, may perform such semantic comparisons. Such LLM, or another suitable computer-implemented technique, may be configured to perform a semantic merge between one or more portions of textual prompt 202 and one or more portions of textual prompts 228, 230, and/or 232, while avoiding the providing of extraneous information, which may interface with subsequent processing.

For example, the image processing system may perform such semantic merge, updating and/or simplification to modify textual prompt 228 of "a white building with a clock on the front of it and a tree in front of it with a sky background, Fitz Henry Lane, matte painting, a detailed matte painting, american scene painting" to prompt 227 of "a Victorian era building, 1870, high quality, soft focus, f/18, 60 mm, in the style of Auguste Renoir"; to modify textual prompt 230 of "a painting of a woman in a black hat and dress with a white dress and a white pillow in her hand, Anne Said, storybook illustration, a storybook illustration, context art" to prompt 229 of "a young woman, 1870, high quality, soft focus, f/18, 60 mm, in the style of Auguste Renoir"; and/or to modify textual prompt 232 of "a cat sitting on a pillow with a black background and a white background with a cat's head, Drew Struzan, plain background, a photorealistic painting, net art" to "a kitten, 1870, high quality, soft focus, f/18, 60 mm, in the style of Auguste Renoir." For example, in performing such updating of prompts 228, 230, and 232 to prompts 227, 229, and 231, respectively, the image processing system may give more weight to initial prompt 102, 202, since prompt 228, 230 and 232 may not provide the same or intended level of context as initial prompt 102, 202, e.g., prompt 102, 202 may be referenced based on providing a higher level of context.

In some embodiments, textual prompts 128, 130, and 132 (and/or textual prompts 127, 129 and 131) may be input to trained machine learning model 108, and based on such input, trained machine learning model 108 may be configured to generate and output a second plurality of images 134, 136, and 138 (which may correspond to images 234, 236, and 238, respectively, of FIG. 2). In some embodiments, images 134, 136, and 138 may correspond to textual prompts 128, 130, and 132, respectively (or images 134, 136, and 138 may correspond to textual prompts 127, 129, and 131, respectively). In some embodiments, images 234, 236, and 238 may correspond to textual prompts 228, 230, and 232, respectively (or images 234, 236, and 238 may correspond to textual prompts 227, 229, and 231, respectively). In some embodiments, model 108 may be fed such input textual prompts along with information indicating, or may otherwise employ, the same one or more parameters previously described, e.g., a choice of sampler, a number of iterations, an attention factor, or any other suitable parameter(s), or any combination thereof. In some embodiments, model 108 may be fed such input textual prompts along with a seed used by trained machine learning model 108 to generate image 110. In some embodiments, images 134, 136, and 138 may be generated based at least in part by the image processing system using images 116, 118, and 120 as guidance.

In some embodiments, one or more images or other data from prior portions of FIGS. 1 and 2 may be used to locally condition the generation of images 134, 136, and 138. For example, one or more of canny edge maps 223, 225 may be used to condition the generation of images 134, 136, and 138, which may help maintain consistency of the overall scene arrangement (e.g., aligning object boundaries and/or object placement and/or object size and/or other suitable characteristics) from image 110 to images 134, 136, and 138 and avoid stitching issues or floating objects. In some embodiments, one or more portions of canny edge maps 223, 225 may be adjusted (e.g., to account for empty regions or holes 219 or 221, or boundaries which may be created by, for example, overlapping objects) in each of the images, to enable trained machine learning model 108 to ignore conditioning in such one or more portions. In some embodiments, the image processing system may refrain from generating, or refrain from using, one or more canny edge maps for one or more background images that may comprise excessive holes or empty regions, e.g., a percentage of area of holes or empty regions that exceeds a threshold).

In some embodiments, each of the generated images 134, 136, and 138 may be clipped or segmented using the outlines of holes or empty regions 219 or 221, which, as described herein, may be used to generate clipping masks 222 and 224. Such features may enable transparency to be added to one or more portions (e.g., a background) of generated images 134, 136, and 138. In some embodiments, generated images 134, 136, and 138 may be organized into layers, and stored in a layer-supported image format, e.g., Photoshop Document (PSD), or any other suitable format.

In some embodiments, in addition to or in the alternative to using clipping masks 222 and 224 to clip or segment or otherwise process generated images 134, 136, and 138, the image processing system may generate new masks based on new segmentations of generated images 134, 136, and 138, such as, for example, by using one or more of the textual prompts as guides to focus the segmentation on the newly generated object. Such features may enable a subject that is partially obstructed by one of more objects to be rendered in its totality, rather than being clipped.

In some embodiments, local conditioning of trained machine learning model 108 (and/or trained machine learning model 126), may additionally or alternatively employ other suitable techniques, e.g., pose estimation, saliency detection algorithms such as, for example: M-LSD straight line detection (e.g., for architectural elements); or holistically nested edge detection (HED) boundary; or any other suitable techniques; or any combination thereof.

In some embodiments, images 234, 236 and 238 may correspond to respective layers of a multi-layer image, and may be composited together to form a multi-layer image, e.g., composite image 240, 242, 244, or 246, which may comprise suitable transparency for such a multi-layer image. As shown in FIG. 2, the image processing system may output to a user a plurality of different alternative for the composite image. For example, composite image 244 may be the most similar to image 210 (e.g., in terms of the woman's center and prominent position with the cat) and other variations (e.g., in a position of, or presence of, the woman, cat and building and/or other objects) may be provided via the other composite images 240, 242, 244, or 246. As another example, composite image 240, 242, 244, or

246 may be generated based on receiving user input, e.g., to edit or move around objects and/or layers corresponding to images 234, 236, and 238.

Figure 3:
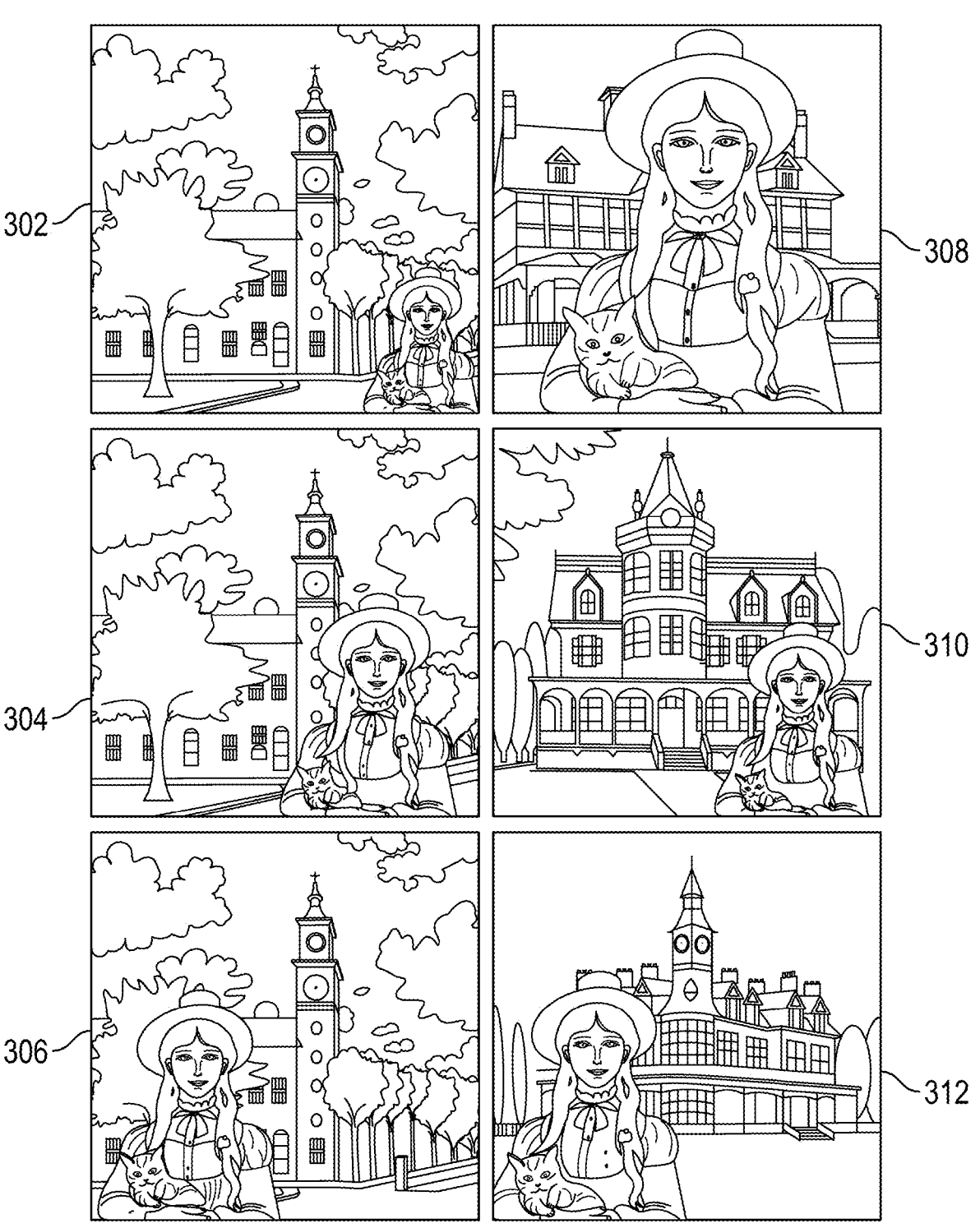
FIG. 3 shows an illustrative variation of a multi-layer image, in accordance with some embodiments of this disclosure.

FIG. 3 shows various other illustrative examples of composite images 302, 304, 306, 308, 310, and 312, each of which may be a variation of a multi-layer image generated based on text 102, and each of which may have varying image characteristics, (e.g., in terms of a position; size; location; color; texture; appearance; and/or other characteristics of the woman, the cat and/or the building; or any suitable combination thereof). For example, the image processing system may generate a number of variations of the same composition by varying the seed used in each of the text-to-image generations. In some embodiments, the image processing system may utilize one or more of the machine learning models described herein to perform batch generation.

In some embodiments, a graphical user interface may be provided to allow control over each step of the layer generation techniques described herein. For example, a user interface may be provided to enable the user to be prompted to confirm or edit the original segmentation (e.g., used to obtain images 216, 218, and 220 of FIG. 2) or refine the prompts (e.g., textual prompts 228, 230, 232 or textual prompts 227, 229, 231) generated after segmentation. In another example, the user interface may provide for the selection of different images generated with different variations of the generated prompts for the user to select.

Figure 4:
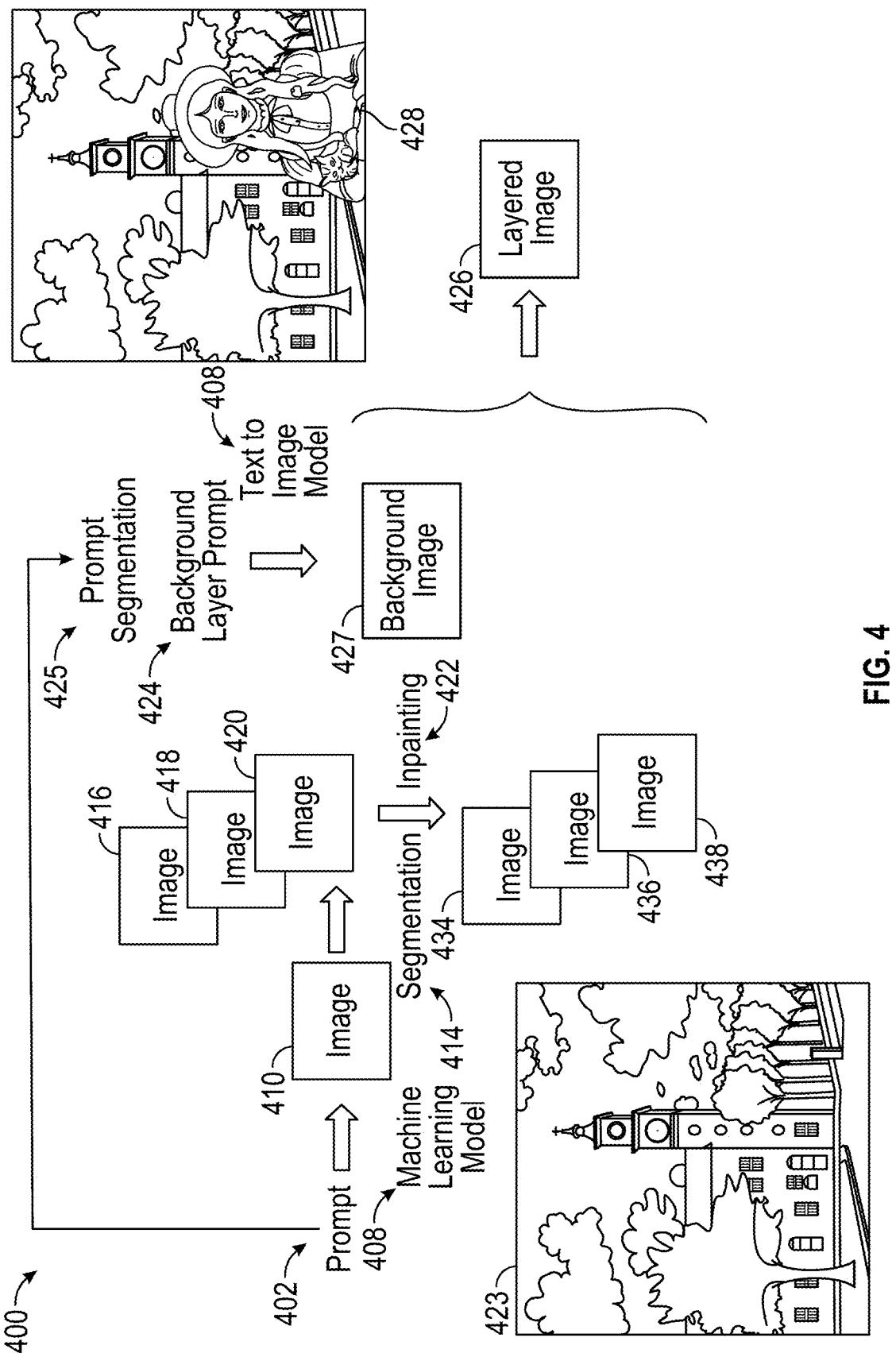
FIG. 4 shows an illustrative block diagram 400 for generating a multi-layer image, in accordance with some embodiments of this disclosure.

FIG. 4 shows an illustrative block diagram 400 for generating a multi-layer image, in accordance with some embodiments of this disclosure. As shown in FIG. 4, the image processing system may receive input of a text prompt 402 in any suitable form. For example, text prompt 402 may correspond to text prompts 102 and 202 of FIGS. 1-2, respectively. Text prompt 402 may be input to machine learning model 408, which may correspond to machine learning model 108. In some embodiments, the image processing system may receive input from the user indicating one or more parameters for machine learning model 408, such as, for example, a choice of sampler (e.g., an Euler sampler, a Heun sampler, a DPM Fast sampler, a DPM2 sampler, or any other suitable sampler, or any combination thereof), a number of iterations (e.g., to obtain a stable picture meaning that the picture or image obtained after N iterations does not significantly differ from the picture obtained in the previous iteration), an attention factor (e.g., a level of attention the model gives to each of the words in text prompt 102), or any other suitable parameter(s), or any combination thereof.

Based on input prompt 402, model 408 may be configured to output image 410 (e.g., representing an interpretation of text input 402, as determined by model 408), which may correspond to image 110 of FIG. 1 and/or first image 210 of FIG. 2. In some embodiments, image 410 is a single-layer image. The image processing system may perform segmentation 414 (which may correspond to segmentation 114 of FIG. 1) on image 410 to obtain images 416, 418, and 420, which may respectively correspond to images 216, 218, and 220 of FIG. 2. In some embodiments, based on segmentation 414, corresponding masks (e.g., 222 and 224 of FIG. 2) may be obtained for one or more of images 416, 418 and 420, respectively. In some embodiments, such masks may correspond to or indicate an alpha channel component.

In some embodiments, after segmentation, one or more of the plurality of images (e.g., 216, 218, and 220 of FIG. 2) representing the segmented objects (e.g., 211, 213, and 215, respectively, of FIG. 2) may have multiple empty regions or holes (e.g., 219 and 221 of FIG. 2) due to clipping out (or extraction) of one or more other objects or portions in image 210, e.g., overlapping on the particular segmented object or portion. In some embodiments, as an alternative to the regeneration of such images (e.g., 216, 218, and 220 of FIG. 2) as images (e.g., 234, 236, and 238 of FIG. 2) based on a text prompt (e.g., one or more of text prompts 227-232 of FIG. 2), the image processing system may be configured to fill such holes or empty regions (e.g., 219, 221 in FIG. 2). As an example, the image processing system may perform completion (e.g., interpolation or extrapolation of image content) or inpainting 422 of such holes or empty regions in images 416, 418, and 420 to obtain updated images 434, 436, and 438. In some embodiments, such inpainting may be performed using one or more of the techniques described in Zheng et al., "Image Inpainting with Cascaded Modulation GAN and Object-Aware Training," Computer Vision—ECCV 2022: 17th European Conference, Tel Aviv, Israel, Oct. 23-27, 2022, Proceedings, Part XVI, the contents of which is hereby incorporated by reference herein in its entirety. In some embodiments, such images 434, 436, and 438 may be obtained at least in part using clipping masks (e.g., clipping masks 222 and 224 of FIG. 2). In some embodiments, clipping masks (e.g., 222 and 224 of FIG. 2) may be modified, e.g., expanded and/or transformed to maximize randomness, to avoid clipped upper layer objects being interpreted by the inpainting process 422 as actual objects.

In some embodiments, the image processing system may determine whether to perform such image completion or inpainting 422 based on a size (e.g., an amount of pixels occupied by the empty region, or a ratio of an amount of pixels occupied by the empty region to the image size) and/or shape and/or other characteristic of the empty regions or holes 219 and 221 of FIG. 2. For example, the image processing system may determine or compute a size of holes 219 and/or 221, and compare such determined size to a threshold size (e.g., a number of pixels or a ratio of an amount of pixels to an image size). The threshold may be set by a user or by the image processing system, and/or may vary based on a type of object in an image and/or based on a type of the image or other characteristic of the image. As an example, if the size of hole 219 (and/or hole 221) exceeds a threshold, the image regeneration techniques described in FIGS. 1-2 may be employed for one or more of images 416, 418 and 420, e.g., to avoid generating unwanted artifacts in the image(s). On the other hand, if the size of hole 219 (and/or hole 221) does not exceed a threshold, the image completion or inpainting 422 techniques described in FIG. 4 may be employed for one or more of images 416, 418 and 420. In some embodiments, such as, for example, if the size of hole 219 of image 218 exceeds the threshold, the image regeneration technique may be performed for image 216 (corresponding to image 416) having hole 219, and if the size of hole 221 of image 218 does not exceed the threshold, the image completion or inpainting 422 technique described in FIG. 4 may be performed on image 218 (corresponding to image 418) having hole 221.

In some embodiments, the image processing system may extract, from text prompt 402, a portion of text input 402 corresponding to one or more images of the plurality of images 416, 418, and/or 420 having at least one empty region or hole of a size that does not exceed the threshold. For example, the image processing system may extract, from text prompt 402, a portion of text input 402 corresponding to a background portion of image 410 (e.g., image 416 of FIG. 4 which may correspond to image 216 of FIG. 2). For example, the image processing system may perform prompt segmentation 425 using a large language model (which may be similar to the large language model used for prompt segmentation 125 of FIG. 1) to extract a portion of input prompt 202 of "a Victorian era building" associated with image 216 (and/or object 213) and optionally context information such as, for example, "1870, high quality, soft focus, f/18, 60 mm, in the style of Auguste Renoir." In some embodiments, such extraction of the background portion and subsequent processing may be performed on the basis of a size of hole (e.g., 216 of FIG. 2) of the background portion of the image exceeding a threshold size, and thus may be deemed as non-suitable for performing an inpainting operation on such image exceeding the threshold size.

In some embodiments, such extraction performed by prompt segmentation 425 may result in background layer text prompt 424, which may be generated by isolating textual references associated with image 216 and/or object 213 from input prompt 202. Background layer text prompt 424 may be input to trained machine learning model 408, and based on such input trained machine learning model 408 may generate and output background image 427 (which may correspond to image 423) as shown in FIG. 4. For example, the image processing system may cause regeneration of a background image portion corresponding to the extracted portion of input prompt 402. In some embodiments, multi-layer image 426 (which may correspond to image 428 of FIG. 4) may be obtained based on background image 427 and one or more of inpainted images 434, 436, and 438 (e.g., inpainted image 436 and 438, since image 416 may not be inpainted if image 416 includes a hole larger than a threshold size). In some embodiments, multi-layer image 426 may be obtained by assembling inpainted images 434, 436, and 438 and/or image 427 into a layered image format, e.g., based on depth map 217.

Figure 5A:
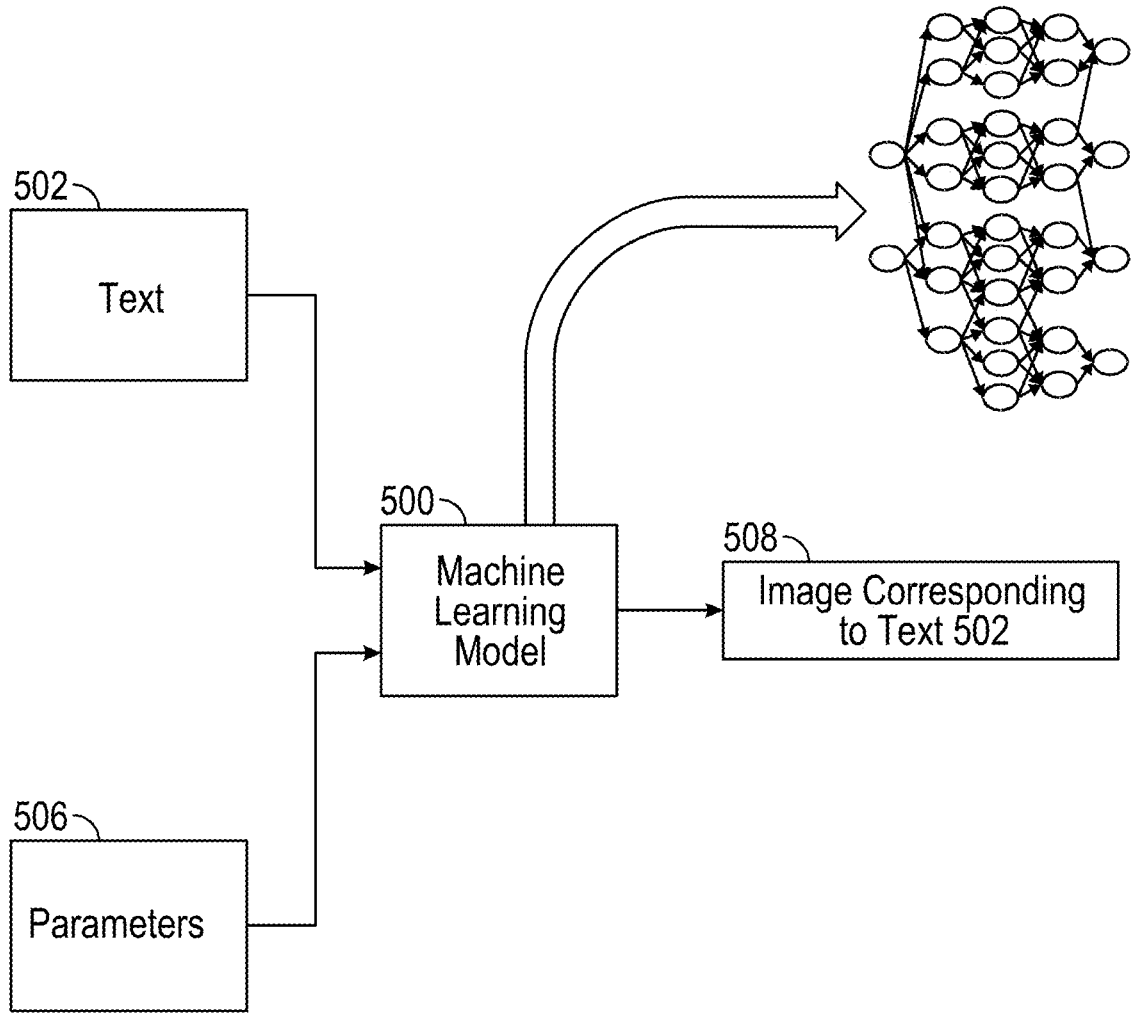
FIGS. 5A-5B show block diagrams of illustrative trained machine learning models, in accordance with some embodiments of this disclosure.
Figure 5B:
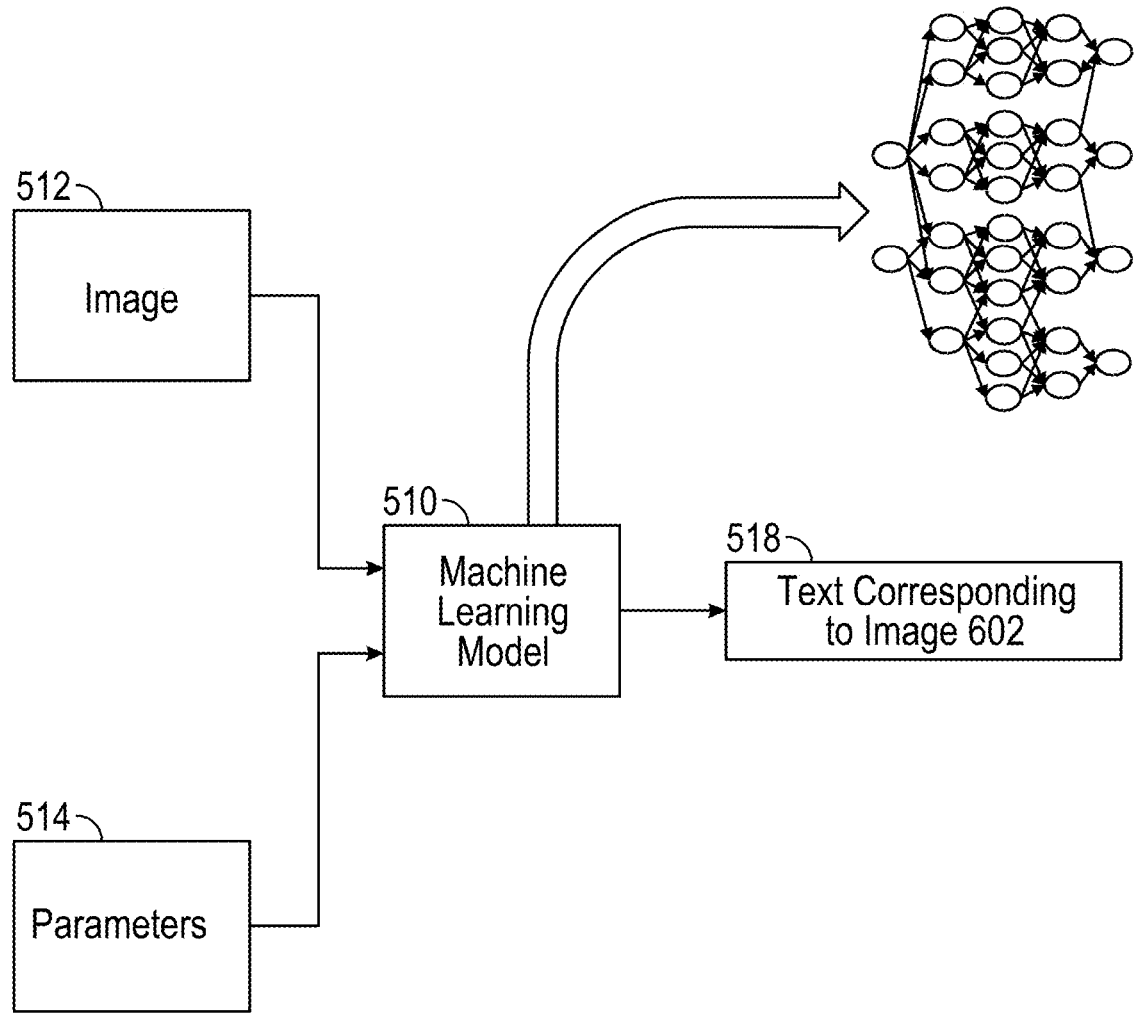

FIGS. 5A-5B show block diagrams of illustrative machine learning models 500 and 510, in accordance with some embodiments of this disclosure. In some embodiments, machine learning model 500 may be, for example: a neural network; a recurrent neural network; a convolutional neural network; an image encoder; a text encoder; a transformer; a classifier; or any other suitable type of machine learning or artificial intelligence model; or any combination thereof. In some embodiments, machine learning model 500 may be configured to receive text 502 as input and output image 508 corresponding to input text 502. In some embodiments, machine learning model 500 may correspond to machine learning model 108 of FIG. 1 and machine learning model 408 of FIG. 4. In some embodiments, machine learning model 500 may receive as input, or otherwise be configured to be implemented, based at least in part on parameters 506 (e.g., a choice of sampler, a number of iterations, an attention factor, or any other suitable parameter(s), or any combination thereof).

FIG. 5B is a block diagram of an illustrative machine learning model 510, in accordance with some embodiments of this disclosure. In some embodiments, machine learning model 510 may be, for example: a neural network; a recurrent neural network; a convolutional neural network; an image encoder; a text encoder; a transformer; a classifier; or any other suitable type of machine learning or artificial intelligence model; or any combination thereof. In some embodiments, machine learning model 510 may be configured to receive image 512 as input and output text 518 corresponding to input image 512. In some embodiments, machine learning model 510 may correspond to machine learning model 126 of FIG. 1. In some embodiments, machine learning model 510 may receive as input, or otherwise be configured to be implemented based at least in part on, parameters 514 (e.g., a choice of sampler; a number of iterations; an attention factor; or any other suitable parameter(s), or any combination thereof).

In some embodiments, machine learning model 500 may be implemented based at least in part on the techniques described in Ramesh et al., "Zero-Shot Text-to-Image Generation," Proceedings of the 38th International Conference on Machine Learning, PMLR 139:8821-8831, 2021," the contents of which is hereby incorporated by reference herein in its entirety. In some embodiments, machine learning model 510 may be implemented based at least in part on the techniques described in Ramesh, Aditya, et al. "Hierarchical text-conditional image generation with clip latents." arXiv preprint arXiv:2204.06125 (2022), the contents of which is hereby incorporated by reference herein in its entirety.

In some embodiments, machine learning model 500 may be implemented based at least in part on the techniques described in Saharia et al. "Photorealistic Text-to-Image Diffusion Models with Deep Language Understanding," arXiv preprint arXiv:2205.11487 (2022), the contents of which is hereby incorporated by reference herein in its entirety. In some embodiments, machine learning model 500 may be implemented based at least in part on the techniques described in Rombach et al. "High-resolution image synthesis with latent diffusion models." Proceedings of the IEEE/CVF Conference on Computer Vision and Pattern Recognition, 2022, the contents of which is hereby incorporated by reference herein in its entirety. In some embodiments, machine learning model 500 may be implemented based at least in part on the techniques described in Radford et al., "Learning Transferable Visual Models From Natural Language Supervision," PMLR 139:8748-8763, 2021, the contents of which is hereby incorporated by reference herein in its entirety.

Figure 5C:
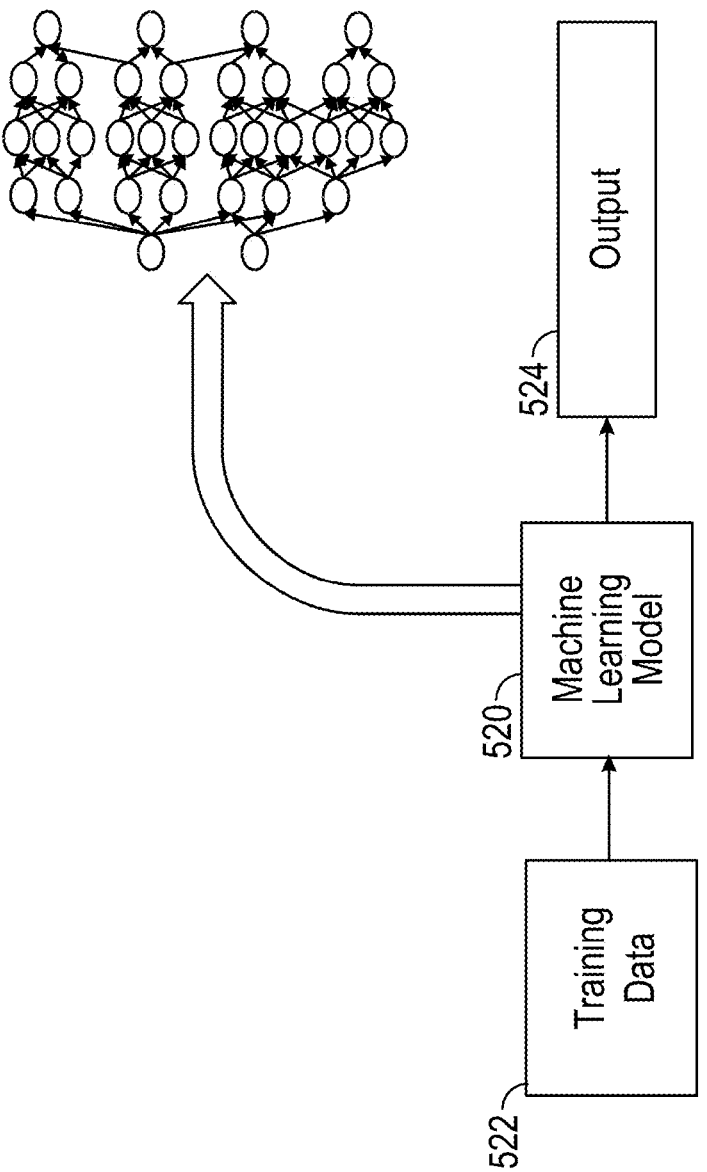
FIGS. 5C-5D show block diagrams for training machine learning models, in accordance with some embodiments of this disclosure
Figure 5D:
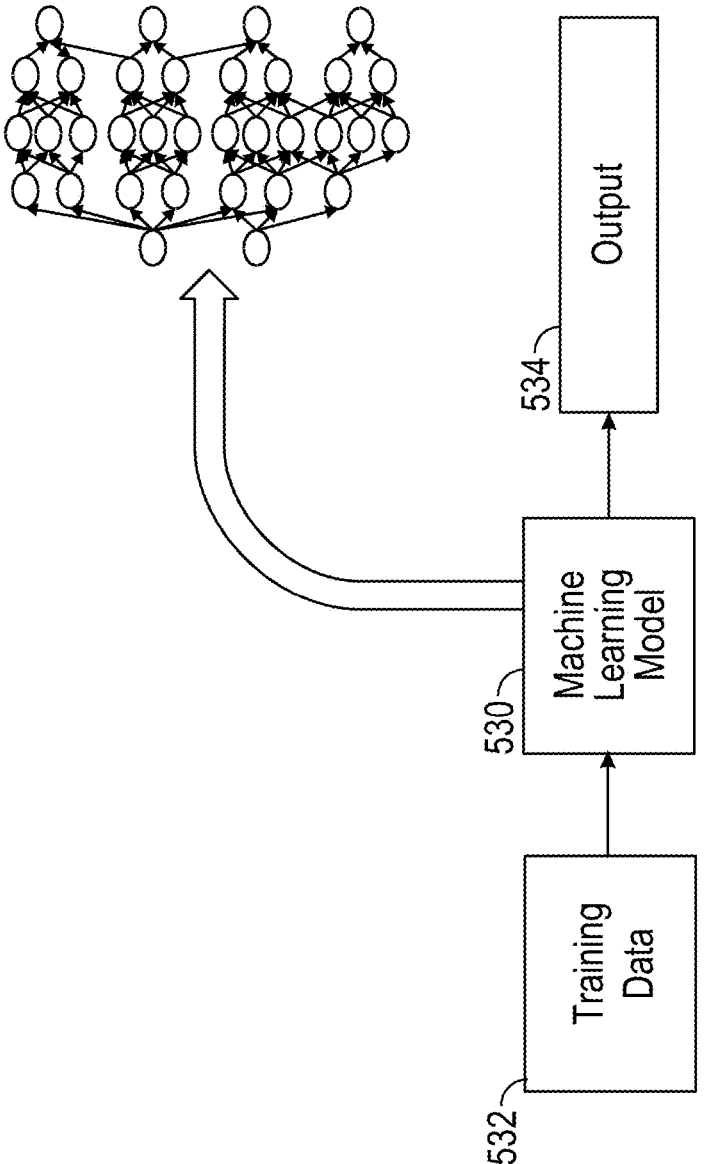

In some embodiments, as shown in FIG. 5C, trained machine learning model 500 may be generated by training untrained machine learning model 520 with training data 522, and as shown in FIG. 5D, trained machine learning model 510 may be generated by training untrained machine learning model 530 with training data 532. In some embodiments, untrained machine learning models 520 and 530 may be trained by an iterative process of adjusting weights (and/or other parameters) for one or more layers of the machine learning model(s). For example, to obtain model 500, the image processing system may input training data 522 (e.g., image and text pairings) into untrained model 520, to obtain outputs 524. As another example, to obtain model 510, the image processing system may input training data 532 (e.g., text and image pairings) into untrained model 530, to generate outputs 534. Such respective outputs 524 and 534 may be compared to ground truth values (e.g., annotated indications of the correct or desired outputs for given input(s)). In some embodiments, the image processing system may then adjust weights or other parameters of machine learning model 500 and 510 based on how closely the output corresponds to the ground truth value. In some embodiments, training process may be repeated until results stop improving or until a certain performance level is achieved (e.g., until 95% accuracy is achieved, or any other suitable accuracy level or other metrics are achieved).

Machine learning model 500 (and 510), input data 502 and 504 (and 512 and 514), training data 522 (and 532), outputs 524 and 534, and/or outputs 508, 518 may be stored at any suitable device(s) and/or server(s) of the image processing system. Machine learning model 500 (and 510)

may be implemented at any suitable device(s) and/or server(s) of the image processing system. In some embodiments, FIGS. 5A-5B may be understood as an inference stage, and FIGS. 5C-5D may be understood as a training stage.

In some embodiments, model 500 (and 510) may be trained to learn features and patterns with respect to particular features of image or text inputs (e.g., certain types or categories of images or text) and corresponding representations thereof. Such learned patterns and inferences may be applied to received data once model 500 (and 510) is trained. In some embodiments, untrained models 520 (and 530) may be trained to obtain model 500 and 510, respectively, and/or model 500 (and 510) may continue to be trained on the fly or may be adjusted on the fly for continuous improvement, based on input data and inferences or patterns drawn from the input data, and/or based on comparisons after a particular number of cycles. In some embodiments, model 500 (and 510) may be content-independent or content-dependent, e.g., may continuously improve with respect to certain types of content. In some embodiments, model 500 and model 510 may comprise any suitable number of parameters.

In some embodiments, model 500 (and 510) may be trained with any suitable amount of training data from any suitable number and/or types of sources. In some embodiments, machine learning model 500 (and 510) may be trained by way of unsupervised learning, e.g., to recognize and learn patterns based on unlabeled data. In some embodiments, machine learning model 500 (and 510) may be trained by supervised training with labeled training examples to help the model converge to an acceptable error range, e.g., to refine parameters, such as weights and/or bias values and/or other internal model logic, to minimize a loss function. In some embodiments, each layer may comprise one or more nodes that may be associated with learned parameters (e.g., weights and/or biases), and/or connections between nodes may represent parameters (e.g., weights and/or biases) learned during training (e.g., using back-propagation techniques, and/or any other suitable techniques). In some embodiments, the nature of the connections may enable or inhibit certain nodes of the network. In some embodiments, the image processing system may be configured to receive (e.g., prior to training) user specification of (or automatic selection of) hyperparameters (e.g., a number of layers and/or nodes or neurons in each model). The image processing system may automatically set or receive manual selection of a learning rate, e.g., indicating how quickly parameters should be adjusted. In some embodiments, the training image data may be suitably formatted and/or labeled by human annotators or otherwise labeled via a computer-implemented process. As an example, such labels may be categorized metadata attributes stored in conjunction with or appended to the training image data. Any suitable network training patch size and batch size may be employed for training model 520 (and 530). In some embodiments, model 500 (and 510) may be trained at least in part using a feedback loop, e.g., to help learn user preferences over time.

In some embodiments, the image processing system may perform any suitable pre-processing steps with respect to training data, and/or data to be input to the trained machine learning model. For example, pre-processing may include causing an image that is to be input to be of a particular size or resolution. In some embodiments, pre-processing may include causing text that is to be input to be of a particular size or format. In some embodiments, pre-processing may include, for example: extracting suitable features from the training images and converting the features into a suitable numerical representation (e.g., one or more vector(s) and/or one or more matrices); normalization; resizing; minimization; brightening portions thereof; darkening portions thereof; color shifting the image among color schemes from color to grayscale; other mapping; cropping the image; scaling the image; adjusting an aspect ratio of the image; adjusting contrast of an image; and/or performing any other suitable operating on or manipulating of the image data; or any combination thereof. In some embodiments, the image capture system may pre-process image or text data to be input to the trained machine learning model, to cause a format of the input image or text data to match the formatting of the training data, or any other suitable processing may be performed, or any combination thereof.

In some embodiments, machine learning model 520 (and 530) may be trained "offline," such as, for example, at a server (e.g., server 904 of FIG. 9) remote from a computing device at which input 102 or 402 of FIG. 1 and FIG. 4 is received, or at a third party. In some embodiments, model 200 may be implemented at such remote server, and/or abstracted by the image processing system (for example, as a set of weights or biases applied to a neural network) and transmitted (e.g., over network 909 of FIG. 9) to a user's computing devices, e.g., having the image processing application or image processing system installed or implemented thereon or provided thereto. For example, the local computing device may lack computational and/or storage resources to train the model from scratch. In some embodiments, each device may iteratively improve the machine learning model 200 locally and send the abstracted model and/or updates back to the server. In some embodiments, the user's computing devices may be configured to locally implement machine learning model 500 and 510.

Figure 6:
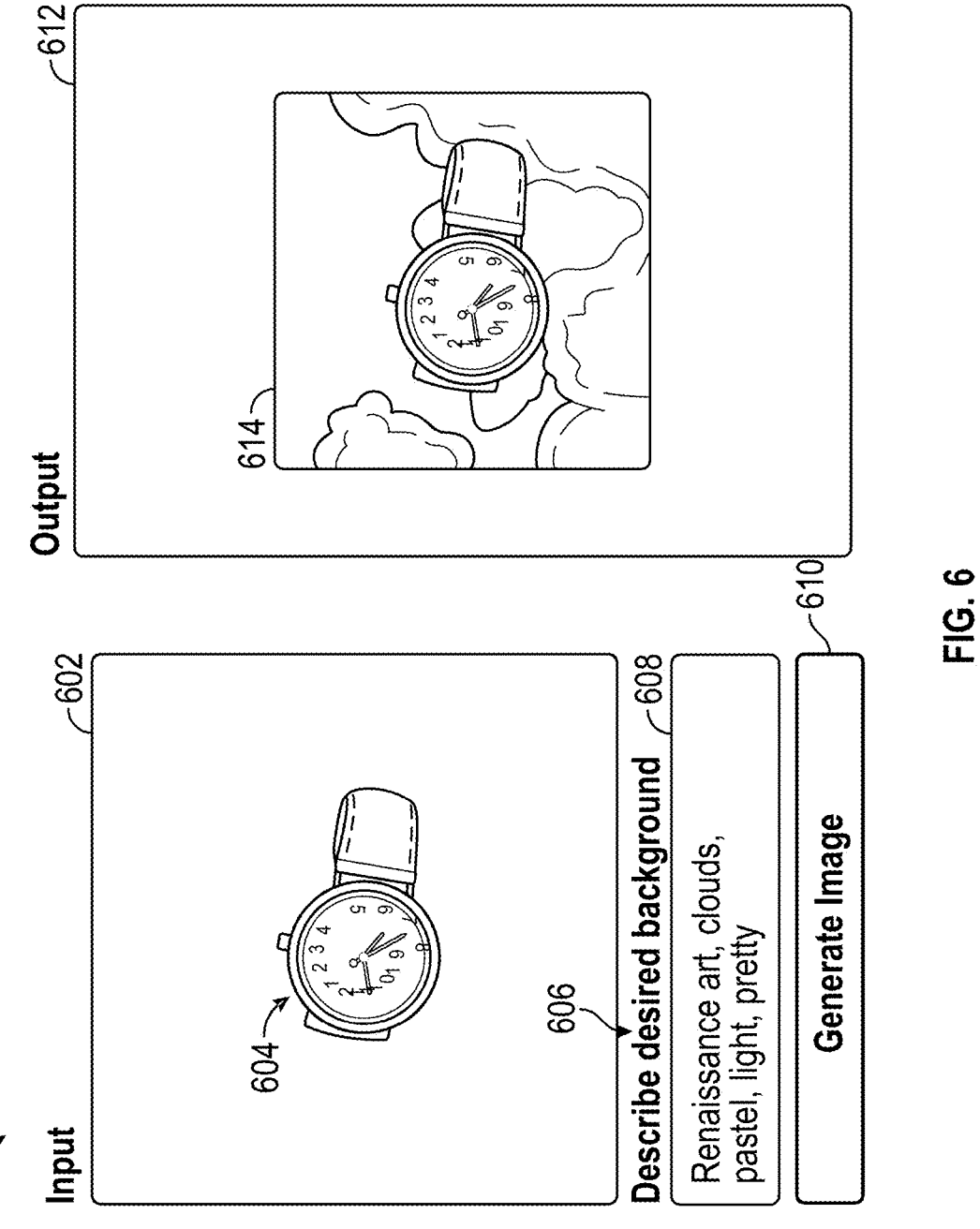
FIGS. 6-7 show illustrative graphical user interfaces (GUIs), in accordance with some embodiments of this disclosure.
Figure 7:
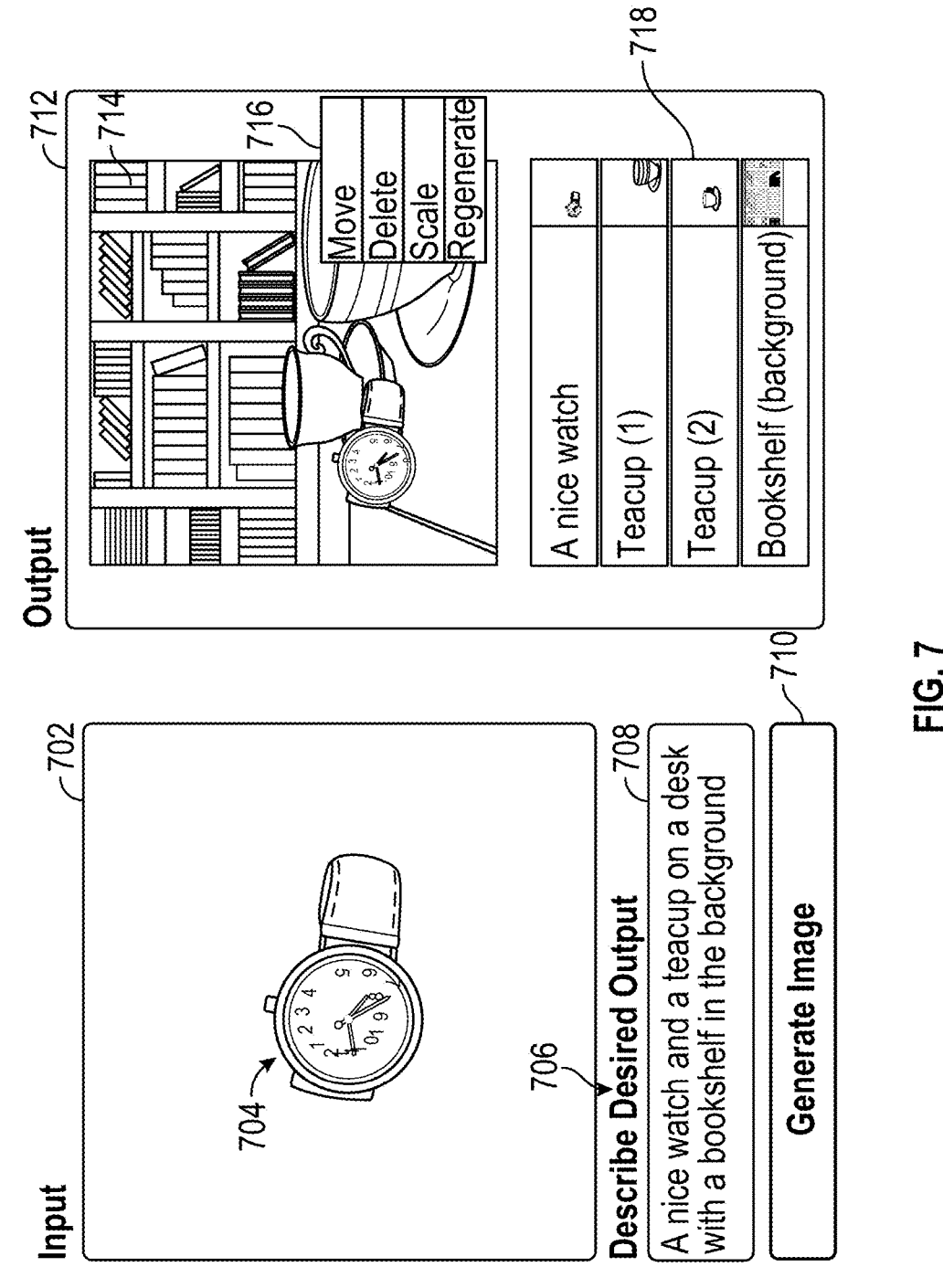

FIGS. 6-7 show illustrative graphical user interfaces (GUIs) 600 and 700, respectively, in accordance with some embodiments of this disclosure. In some embodiments, GUI 600 and 700 may be provided by any suitable platform, website, application (e.g., a social media, image storage, image management, and/or image editing application, or any combination thereof) or operating system. Inputs can be received at the user interfaces of FIGS. 6-7 in any suitable form (e.g., tactile or touch input; a mouse click; selection of a user interface or hardware button or option; voice input; biometric input; or any other suitable input; or any combination thereof).

GUI 600 may comprise a portion 602 at which the image processing system may receive input of an image from a user. For example, the image processing system may receive input of image 604 of a watch, e.g., based on user input or request specifying image 604. In some embodiments, image 604 may be accessed automatically, e.g., without explicit user input inputting such image, such as, for example, as a recommendation to a user based on user preferences or historical user interactions.

In some embodiments, image 604 may correspond to image 110 (or a portion thereof) or an object included in image 110, e.g., as generated by machine learning model 108 of FIG. 1, and/or otherwise input specified by a user of the image processing system. For example, as shown in FIGS. 6-7, a social media platform or other suitable platform may integrate the generative AI tools and other techniques described herein in its content creation workflow, and may allow a user such platform control over the generated content (e.g., user-generated content for social media and/or advertisements).

Portion 606 of GUI 600 may enable specifying input of a textual prompt 608, to request an image to be generated for inclusion as a layer of a composite image that also is to include a layer or portion corresponding to image 604. Based on receiving user selection of option 610, the image processing system may, using the techniques described herein, generate for display image 614 at output portion 612 of GUI 600. Image 614 may be a multi-layer image comprising a background that corresponds to input 608 (e.g., "Renaissance art, clouds, pastel, light, pretty") and a foreground portion of image 614 may correspond to image 604. In some embodiments, one or more options (e.g., similar to the options shown at 716 of FIG. 7) may be provided, to enable modification of one or more portions or characteristics of image 614 (e.g., to move, delete, scale and/or regenerate the watch portion (and/or other portion(s)) of image.

As shown in FIG. 7, GUI 700 may comprise a portion 702 at which the image processing system may receive input of an image from a user. For example, the image processing system may receive input of image 704 of a watch, e.g., based on a user input or request specifying image 704. In some embodiments, image 704 may be accessed automatically, e.g., without explicit user input inputting such image, such as, for example, as a recommendation to a user based on user preferences or historical user interactions.

Figure 8:
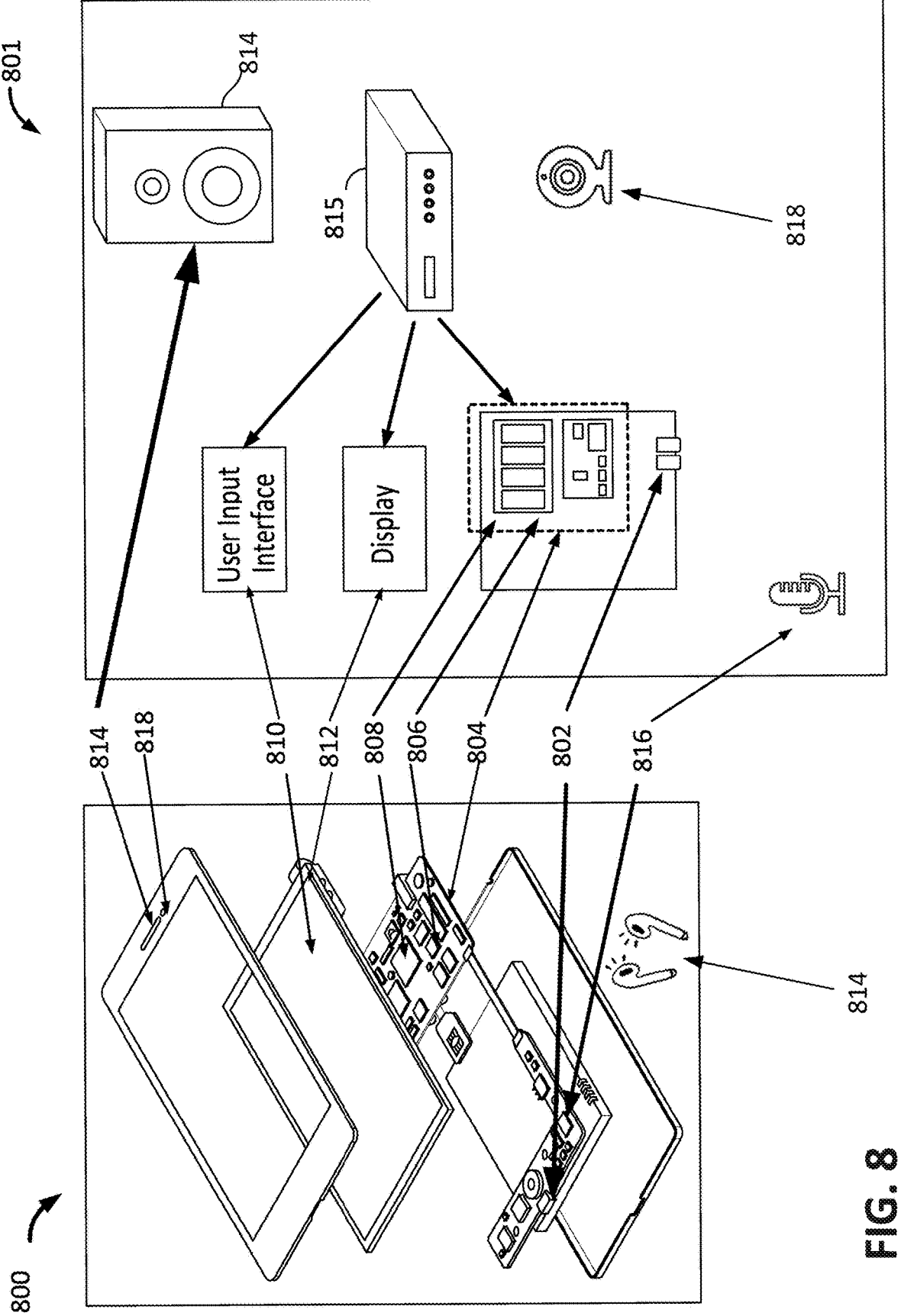
FIGS. 8-9 show illustrative devices and systems for generating a multi-layer image, in accordance with some embodiments of this disclosure.
Figure 9:
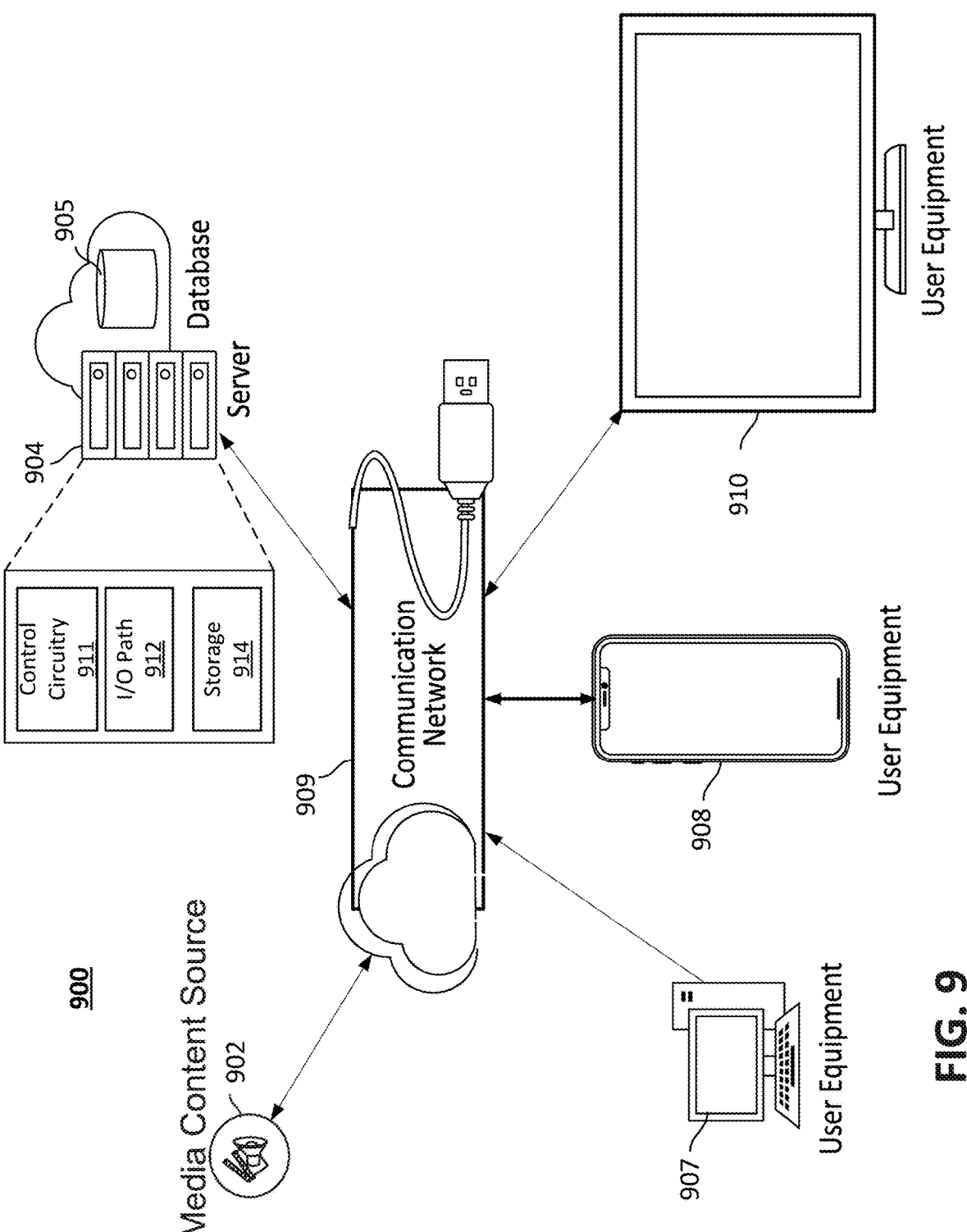

In some embodiments, image 604 (and 704) may be accessed over a network (e.g., communication network 909 of FIG. 9 or any other suitable network) stored at, for example, media content source 902 and/or server 904 of FIG. 9; may be accessed from a website; application; or any other suitable data source; or any combination thereof. Additionally or alternatively, the image processing system may access one or more of 604 (and 704) by capturing and/or generating the images, and/or retrieving the images from memory (e.g., memory or storage of computing device 800 or 801 of FIG. 8; memory or storage 914 of server 904 or database 905 of FIG. 9; or any other suitable data store; or any combination thereof) and/or receiving the images over any suitable data interface; or by accessing the images using any other suitable methodology; or any combination thereof.

In some embodiments, image 704 may correspond to image 110 (or a portion thereof) or an object included in image 110, e.g., as generated by machine learning model 108 of FIG. 1, and/or otherwise input specified by a user of the image processing system. For example, as shown in FIGS. 6-7, a social media platform or other suitable platform may integrate the generative AI tools and other techniques described herein in its content creation workflow, and may allow a user such platform control over the generated content (e.g., user-generated content for social media and/or advertisements).

Portion 706 of GUI 700 may enable specifying input of a textual prompt 708, to request an image to be generated for inclusion as a layer of a composite image that also is to include a layer or portion corresponding to image 704. Based on receiving user selection of option 710, the image processing system may, using the techniques described herein, generate for display image 714 at output portion 712 of GUI 700. Image 714 may be a multi-layer image comprising one or more portions that correspond to input 708 (e.g., "A nice watch and a teacup on a desk with a bookshelf in the background") and a foreground portion of image 714 may include image 704. In some embodiments, one or more options 716 may be provided, to enable modification of one or more portions or characteristics of image 714 (e.g., to move, delete, scale and/or regenerate the watch portion (and/or other portion(s)) of image 714). In some embodiments, as shown at 718, each object or portion of image 714 may be listed and may be selectable to modify such object or portion.

Such features of FIGS. 6-7 may enable integration of generative AI-assisted creation of image layers into a social media content creation workflow while maintaining an ease of use for the user in such environment. This may permit addition of other elements in the image composition and allow such elements to be placed, moved, and/or scaled by the user. In some embodiments, such techniques may be used to generate layered images based on what a user may see on his or her feed, allowing easy replacement and/or modification and/or translation of elements (e.g., adjusting colors, cropping, zooming, applying filters, overlaying objects on another object or portion of an image, and/or other image effects) in an original post, e.g., to allow users to edit and personalize content. The techniques described herein may be applicable to generating (and operating on) layered still images as well as generating layered animated images or videos and/or other suitable layered imagery.

In some embodiments, the image processing system may be configured to generate a first image based on a first prompt using a first text-to-image model, segment the first image into a plurality of objects and associated clipping masks; generate a first plurality of images of said object on transparent backgrounds using the first text-to-image model; generate a plurality of prompts from the first plurality of images and the first prompt using a first image-to-text model; generate a second plurality of images from the plurality of prompts, the first plurality of images and the plurality of clipping masks using the first text-to-image model; and assemble the second plurality of images into a layered image. In some embodiments, the assembling the second plurality of images into a layered image is performed using a depth map of the first image. In some embodiments, generating a second plurality of images from the plurality of prompts, the first plurality of images and the plurality of clipping masks is done by locally conditioning the first text-to-image model with a canny map of each of the second plurality of images. In some embodiments, the first image-to-text model is CLIP.

In some embodiments, generating a plurality of prompts from the first plurality of images and the first prompt comprises using a large language model to extract a first plurality of objects from the first prompt; using a large language model to extract a first plurality of style guidance for each object in the first prompt; using an image-to-text model to generate a second plurality of objects from each image in the first plurality of images; performing a semantic merge between the first plurality of objects and the second plurality of objects using a large language model to obtain a third plurality of objects; and applying the first plurality of style guidance to the third plurality of objects to obtain a plurality of prompts.

In some embodiments, one or more of GUI 600, 700 may provide a user an option to select for modification one or more layers of a generated multi-layer image. For example, for composite image 240, a user may be provided via the GUI with an option to keep the depiction of the building, but to regenerate the cat (e.g., based on the user modifying an input prompt 232 but maintaining the other prompts). That is, the user may be permitted to individually select layers and rework those layers.

FIGS. 8-9 show illustrative devices, systems, servers, and related hardware for generating a multi-layer image, in accordance with some embodiments of this disclosure. FIG. 8 shows generalized embodiments of illustrative computing devices 800 and 801, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR head-mounted display (HMD); a VR HMID; or any other suitable computing device; or any combination thereof. In another example, computing device 801 may be a user television equipment system or device.

User television equipment device 801 may include set-top box 815. Set-top box 815 may be communicatively connected to microphone 816, Audio output equipment (e.g., speaker or headphones 814), and display 812. In some embodiments, microphone 816 may receive audio corresponding to a voice of a user providing input (e.g., text input 102 of FIG. 1). In some embodiments, display 812 may be a television display or a computer display. In some embodiments, set-top box 815 may be communicatively connected to user input interface 810. In some embodiments, user input interface 810 may be a remote control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 9. In some embodiments, computing device 800 may comprise any suitable number of sensors (e.g., gyroscope or gyrometer, or accelerometer, etc.), and/or a GPS module (e.g., in communication with one or more servers and/or cell towers and/or satellites) to ascertain a location of computing device 800. In some embodiments, computing device 800 comprises a rechargeable battery that is configured to provide power to the components of the device.

Each one of computing device 800 and computing device 801 may receive content and data via input/output (I/O) path 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 3 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., computing device 800), an XR device; a tablet; a network-based server hosting a user-accessible client device; a non-user-owned device; any other suitable device; or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the image processing system or application stored in memory (e.g., storage 808). Specifically, control circuitry 804 may be instructed by the image processing system or application to perform the functions discussed above and below. In some implementations, processing or actions performed by control circuitry 804 may be based on instructions received from the image processing system or application.

In client/server-based embodiments, control circuitry 804 may include communications circuitry suitable for communicating with a server or other networks or servers. The image processing system or application may be a stand-alone application implemented on a device or a server. The image processing system or application may be implemented as software or a set of executable instructions. The instructions for performing any of the embodiments discussed herein of the image processing system or application may be encoded on non-transitory computer-readable media (e.g., a hard drive, random-access memory on a DRAM integrated circuit, read-only memory on a BLU-RAY disk, etc.). For example, in FIG. 3, the instructions may be stored in storage 808, and executed by control circuitry 804 of a device 800.

In some embodiments, the image processing system or application may be a client/server application where only the client application resides on device 800 (e.g., device 104), and a server application resides on an external server (e.g., server 904 and/or server 904). For example, the image processing system or application may be implemented partially as a client application on control circuitry 804 of device 800 and partially on server 904 as a server application running on control circuitry 911. Server 904 may be a part of a local area network with one or more of devices 800, 801 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 904 and/or an edge computing device), referred to as "the cloud." Device 800 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904, the image processing system or application may instruct control circuitry 911 to perform processing tasks for the client device and facilitate the generation of multi-layer images. The client application may instruct control circuitry 804 to determine whether processing should be offloaded.

Control circuitry 804 may include communications circuitry suitable for communicating with a server, edge computing systems and devices, a table or database server, or other networks or servers The instructions for carrying out the above mentioned functionality may be stored on a server (which is described in more detail in connection with FIG. 9. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of computing devices, or communication of computing devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as the image processing system or application data described above. Nonvolatile memory may also be used (e.g., to launch a boot-up routine and other instructions). Cloud-based storage, described in more detail in relation to FIG. 9, may be used to supplement storage 808 or instead of storage 808.

Control circuitry 804 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of computing device 800. Control circuitry 804 may also include digital-to-analog converter circuitry and analog-to-digital converter circuitry for converting between digital and analog signals. The tuning and encoding circuitry may be used by computing device 800, 801 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from computing device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of computing device 800 and computing device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of computing device 800 and computing device 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words or terms or numbers that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The image processing system or application may be implemented using any suitable architecture. For example, it may be a stand-alone application wholly-implemented on each one of computing device 800 and computing device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide video conferencing functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a conference participant profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the image processing system or application is a client/server-based application. Data for use by a thick or thin client implemented on each one of computing device 800 and computing device 801 may be retrieved on-demand by issuing requests to a server remote to each one of computing device 800 and computing device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on computing device 800. This way, the processing of the instructions is performed remotely by the server while the resulting displays (e.g., that may include text, a keyboard, or other visuals) are provided locally on computing device 800. Computing device 800 may receive inputs from the user via input interface 310 and transmit those inputs to the remote server for processing and generating the corresponding displays. For example, computing device 800 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 800 for presentation to the user.

In some embodiments, the image processing system or application may be downloaded and interpreted or otherwise run by an interpreter or virtual machine (run by control circuitry 804). In some embodiments, image processing system or application may be encoded in the ETV Binary Interchange Format (EBIF), received by control circuitry 804 as part of a suitable feed, and interpreted by a user agent running on control circuitry 804. For example, the image processing system or application may be an EBIF application. In some embodiments, the image processing system or application may be defined by a series of JAVA-based files that are received and run by a local virtual machine or other suitable middleware executed by control circuitry 804. In some of such embodiments (e.g., those employing MPEG-2, MPEG-4, HEVC or any other suitable digital media encoding schemes), the image processing system or application may be, for example, encoded and transmitted in an MPEG-2 object carousel with the MPEG audio and video packets of a program.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

FIG. 9 is a diagram of an illustrative system 900 for enabling user controlled extended reality, in accordance with some embodiments of this disclosure. Computing devices 907, 908, 910 (which may correspond to, e.g., computing device 800 or 801) may be coupled to communication network 909. Communication network 909 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 909.

System 900 may comprise media content source 902, one or more servers 904, and/or one or more edge computing devices. In some embodiments, image processing system or application may be executed at one or more of control circuitry 911 of server 904 (and/or control circuitry of computing devices 907, 908, 910 and/or control circuitry of one or more edge computing devices). In some embodiments, the media content source and/or server 904 may be configured to host or otherwise facilitate video communication sessions between computing devices 907, 908, 910 and/or any other suitable computing devices, and/or host or otherwise be in communication (e.g., over network 909) with one or more social network services.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide video conferencing data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

FIG. 10 is a flowchart of a detailed illustrative process 1000 for generating a multi-layer image, in accordance with some embodiments of this disclosure. In various embodiments, the individual steps of process 1000 may be implemented by one or more components of the devices, methods, and systems of FIGS. 1-9 and 11 and may be performed in combination with any of the other processes and aspects described herein. Although the present disclosure may describe certain steps of process 1000 (and of other processes described herein) as being implemented by certain components of the devices, methods, and systems of FIGS. 1-9 and 11, this is for purposes of illustration only, and it should be understood that other components of the devices, methods, and systems of FIGS. 1-9 and 11 may implement those steps instead.

At 1002, control circuitry (e.g., control circuitry 804 of FIG. 8 and/or control circuitry 904 of FIG. 9) and/or I/O circuitry (e.g., 802 of FIG. 8 and/or 912 of FIG. 9), may receive text input (e.g., prompt 102 of FIG. 1) and input or provide the text input to a first trained machine learning model (e.g., text-to-image machine learning model 108 of FIG. 1, which may correspond to machine learning model 500 of FIG. 5A).

At 1004, the control circuitry may generate, using the first trained machine learning model and based on the text input, a single-layer image (e.g., image 110 of FIG. 1 which may correspond to image 210 of FIG. 2) comprising a plurality of objects (e.g., building 211, woman 213, and cat 215 of FIG. 2). In some embodiments, the trained machine learning model (e.g., machine learning model 108 of FIG. 1) may receive as input, or otherwise be configured to be implemented based at least in part on, parameters (e.g., 504 in FIG. 5A, such as, for example, a choice of sampler, a number of iterations, an attention factor, or any other suitable parameter(s), or any combination thereof). In some embodiments, the control circuitry may generate a depth map (e.g., depth map 217 of FIG. 2) for the single-layer image (e.g., image 210 of FIG. 2).

At 1006, the control circuitry may segment the single-layer image to generate a first plurality of images (e.g., images 116, 118, and 120 of FIG. 1 which may respectively correspond to images 216, 218, and 220 of FIG. 2), each comprising a depiction of a respective object (e.g., building 211, woman 213, and cat 215 of FIG. 2) of the plurality of objects of the single-layer image (e.g., image 210 of FIG. 2). In some embodiments, the control circuitry may use each of the initial prompt (e.g., text prompt 102 of FIG. 1 or text prompt 202 of FIG. 2) and the resulting image (e.g., image 110 of FIG. 1 or image 210 of FIG. 2) to segment the image into the plurality of images which may respectively correspond to a plurality of layers. For example, the control circuitry may use semantic segmentation and/or object recognition techniques to ensure consistency between the original prompt (e.g., 102 of FIG. 1 or 202 of FIG. 2) and the generated object images (e.g., 116, 118, and 120 of FIG. 1, or 216, 218, and 220 of FIG. 2). At 1008, the control circuitry may generate a plurality of clipping masks (e.g., mask 222 and mask 224) for image 216 and 218, respectively, based on the segmentation described at 1006.

At 1010, the control circuitry may determine a plurality of attributes associated with the plurality of objects. For example, the control circuitry may generate canny maps 223 and 225 for images 218 and 220, respectively, based on detecting edges and/or boundaries and/or other characteristics of objects within such images. In some embodiments, control circuitry may determine that, as a result of the segmenting described in connection with 1006, each respective image (or a subset) of the first plurality of images (e.g., image 216, 218 and/or 220 of FIG. 2 and/or image 116, 118, and/or 120 of FIG. 1) comprises at least one empty region or hole (e.g., 219 and/or image 221 of FIG. 2) at a portion of the respective image at which one or more objects of the plurality of objects is depicted in the single-layer image (e.g., image 110 of FIG. 1 and/or image 210 of FIG. 2).

At 1012, the control circuitry may determine whether a size of each empty region or hole exceeds a threshold (e.g., a number of pixels occupied by the empty region, or a ratio of an amount of pixels occupied by the empty region to an image size). The threshold may be set by a user or by the image processing system, and/or may vary based on a type of object in an image and/or based on a type of the image or other characteristic of the image. If at least one of the sizes of the holes or empty regions does not exceed the threshold, processing may proceed to 1014 (and thus to 1102 of FIG. 11); otherwise processing may proceed to 1016.

At 1016, the control circuitry may generate, using a second trained machine learning model (e.g., machine learning model 126 of FIG. 1, which may correspond to machine learning model 510 of FIG. 5B), a plurality of textual descriptions (e.g., 127, 129, and 131 of FIG. 1 or 227, 229 and 231 of FIG. 2) respectively corresponding to the plurality of objects (e.g., 211, 213, and 215 of FIG. 2). For example, the second trained machine learning model may comprise an image-to-text machine learning model.

In some embodiments, the second trained machine learning model may comprise a trained LLM, and the plurality of textual descriptions (e.g., 127, 129, and 131 of FIG. 1 or 227, 229 and 231 of FIG. 2) may be obtained directly by inputting prompt 102 of FIG. 1 or prompt 202 of FIG. 2 (or portions thereof) to such trained LLM machine learning model and/or using other suitable natural language processing techniques.

In some embodiments, if a hole or empty region of one or more of the first plurality of images is large (e.g., above the threshold indicated at 1012, and/or above a different, higher size threshold), the control circuitry may reference the original prompt 202 or image 210 of FIG. 2 (or original prompt 102 or image 110 of FIG. 1) to determine an object that corresponds to such hole or empty region. For example, if hole 219 of image 216 is determined to be significantly large such that machine learning model 126 may have difficulty identifying and/or extracting object(s) in image 216, the control circuitry may use the original prompt (e.g. prompt 102 of FIG. 1 or 202 of FIG. 2) to infer what the object in image 216 is (e.g., a building) by extracting a portion of prompt 102 of FIG. 1 or 202 of FIG. 2, and may input such extracted portion of the prompt machine learning model 108, to generate image 134 (e.g., without the significantly large empty region or hole).

At 1018, the control circuitry may determine whether to modify the plurality of textual descriptions based on the text input received at 1002. For example, as shown in FIG. 1, the control circuitry may perform prompt segmentation 125 to ensure that each of the plurality of textual descriptions is consistent with the corresponding portion of input prompt 102. For example, the image processing system may obtain modified textual descriptions at 1020 by performing a semantic merge, update and/or simplification to modify textual prompt 228 of "a white building with a clock on the front of it and a tree in front of it with a sky background, Fitz Henry Lane, matte painting, a detailed matte painting, american scene painting" to prompt 227 of "a Victorian era building, 1870, high quality, soft focus, f/18, 60 mm, in the style of Auguste Renoir"; to modify textual prompt 230 of "a painting of a woman in a black hat and dress with a white dress and a white pillow in her hand, Anne Said, storybook illustration, a storybook illustration, context art" to prompt 229 of "a young woman, 1870, high quality, soft focus, f/18, 60 mm, in the style of Auguste Renoir"; and/or to modify textual prompt 232 of "a cat sitting on a pillow with a black background and a white background with a cat's head, Drew Struzan, plain background, a photorealistic painting, net art" to "a kitten, 1870, high quality, soft focus, f/18, 60 mm, in the style of Auguste Renoir." In some embodiments, the control circuitry may generate for display to a user an option to select which of the plurality of textual descriptions (e.g., 227, 229 and 231 of FIG. 2, and/or 228, 230, and 232 of FIG. 2) should be used at 1022.

At 1022, the control circuitry may input the plurality of textual descriptions (or modified versions thereof), and the plurality of attributes (e.g., canny maps 223 and/or 225 of FIG. 2), to the first trained machine learning model (e.g., machine learning model 108 of FIG. 1). At 1024, the control circuitry may generate, using the first trained machine learning model and based on the plurality of textual descriptions (e.g., 227, 229, 231 and/or 228, 230, 232) and the plurality of attributes (e.g., canny maps 223 and/or 225 of FIG. 2), a plurality of images (e.g., images 234, 236, and 238) respectively corresponding to the plurality of textual descriptions. In some embodiments, such techniques may be used to fill the empty regions or holes, e.g., 219, 221 of FIG. 2, by regenerating such image(s) while maintaining consistency of the initially generated single-layer image.

At 1026, the control circuitry may generate the multi-layer image (e.g., multi-layer image 240, 242, 244, or 246) by combining the second plurality of images (e.g., images 234, 236, and 238) and by using the plurality of masks (e.g.,

222 and 224 of FIG. 2). Such plurality of images may respectively correspond to a plurality of layers of the multi-layer image. In some embodiments, the clipping masks may be used to ensure that the multiple layers do not overlap each other. In some embodiments, the clipping masks may be usable to segment, and/or add transparency to one or more portions of, the second plurality of images. In some embodiments, a particular mask (e.g., mask 222 of FIG. 2) and/or other suitable information may be used to generate an object image (e.g., woman 236) without any empty regions or holes, and another mask (e.g., mask 224) and/or other suitable information may be used to generate an object image (e.g., cat 238) without any empty regions or holes. In some embodiments, the layers may be ordered based at least in part on the generated depth map. In some embodiments, a GUI may be provided to the user to enable the user to perform clipping or other modification of the output multi-layer images, and/or at any other suitable step of the process of FIGS. 10-11.

FIG. 11 is a flowchart of a detailed illustrative process 1100 for generating a multi-layer image, in accordance with some embodiments of this disclosure. In various embodiments, the individual steps of process 1100 may be implemented by one or more components of the devices, methods, and systems of FIGS. 1-10 and may be performed in combination with any of the other processes and aspects described herein. Although the present disclosure may describe certain steps of process 1100 (and of other processes described herein) as being implemented by certain components of the devices, methods, and systems of FIGS. 1-10, this is for purposes of illustration only, and it should be understood that other components of the devices, methods, and systems of FIGS. 1-10 may implement those steps instead.

At 1102, control circuitry (e.g., control circuitry 804 of FIG. 8 and/or control circuitry 904 of FIG. 9), may determine, based on the determination performed at 1012 of FIG. 10, that at least one of the first plurality of images (e.g., images 416, 418 and 420) includes a hole or empty region (e.g., 219 and 221 of FIG. 2) having a size that does not exceed the threshold. At 1104, the control circuitry may determine whether the size of any of the empty regions or holes of the plurality of images (e.g., images 416, 418 and 420) includes a hole or empty region (e.g., 219 and 221 of FIG. 2) has a size that exceeds the threshold. If so, processing may proceed to 1110; otherwise, processing may proceed to 1106.

At 1106, the control circuitry, based on determining at 1104 that each of the first plurality of images (e.g., 416, 418, and 420 of FIG. 4) either do not include empty regions or include empty regions that are below a threshold size, may modify empty regions of each of the first plurality of images (or a subset thereof) by causing the empty regions of the first plurality of images to be filled in. As an example, the image processing system may perform completion (e.g., interpolation or extrapolation of image content) or inpainting (e.g., shown at 422 of FIG. 4) of such holes or empty regions in the images (e.g., 416, 418, and 420 of FIG. 4) to obtain updated images (e.g., 434, 436, and 438 of FIG. 4). In some embodiments, such updated images (e.g., 434, 436, and 438) may be obtained at least in part using clipping masks (e.g., clipping masks 222 and 224 of FIG. 2). In some embodiments, clipping masks (e.g., 222 and 224 of FIG. 2) may be modified, e.g., expanded and/or transformed to maximize randomness, to avoid clipped upper layer objects being interpreted by the inpainting process 422 as actual objects.

At 1108, the control circuitry may generate a multi-layered image based on the modified first plurality of images obtained at 1106. For example, the control circuitry may composite such images (e.g., images 434, 436, and 438) together to generate a composite multi-layer image (e.g., image 426) in a similar manner to the processing discussed in connection with 1026 of FIG. 10.

At 1110, the control circuitry may perform processing similar to 1106 on the image(s) of the first plurality of images having holes or empty regions that are determined to be of a size that is below the threshold size.

At 1112, the control circuitry may identify portion(s) of the text input (e.g., text input 402 of FIG. 4) that describes or relates to portion(s) of the single-layer image (e.g., a background portion, corresponding building 211 of FIG. 2) that correspond to image(s) (e.g., image 216 of FIG. 2 which may correspond to image 416 of FIG. 4, and/or based on the background portion 423 shown in FIG. 4) of the first plurality of images having empty region(s) of a size that exceeds the threshold. For example, since hole 219 of image 216 of FIG. 2 may be determined to be of a size that exceeds the threshold, the control circuitry may identify a portion of the text input describing a background portion (e.g., corresponding to building 211 of FIG. 2) of the single-layer image (e.g., "a Victorian era building, 1870, high quality, soft focus, f/18, 60 mm, in the style of Auguste Renoir"). While in this example, such background portion is described as having the empty region or hole exceeding the threshold size, in some embodiments, any suitable number or types of portions of an image may include an empty region or hole exceeding the threshold size.

In some embodiments, if an image of the first plurality of images is determined to comprise multiple empty regions or holes, the control circuitry may determine whether any of such empty regions or holes exceeds the threshold size (e.g., even if another of the holes is below the threshold size). If so, processing may proceed to 1112 for such image; otherwise processing may be performed at 1106 or 1110 for such image. In some embodiments, for a particular image, the control circuitry may determine whether to proceed to 1112, or to 1106 or 1110, based on a sum of sizes of multiple holes within an image, and/or based on locations of such holes or empty regions within the particular image. In some embodiments, if a hole or empty region is large (e.g., above the threshold, and/or above a different, higher size threshold), the control circuitry may reference the original prompt 202 or image 210 to determine an object that corresponds to such hole or empty region. For example, if hole 219 of image 216 is determined to be significantly large such that machine learning model 126 may have difficulty identifying and/or extracting object(s) in image 216, the control circuitry may use the original prompt (e.g. prompt 102 of FIG. 1 or 202 of FIG. 2) to infer what the object in image 216 is (e.g., a building) by extracting a portion of prompt 102 of FIG. 1 or 202 of FIG. 2, and may input such extracted portion of the prompt machine learning model 108, to generate image 134.

At 1114, the control circuitry may extract (e.g., using prompt segmentation 425 of FIG. 4), from the text input (e.g., prompt 402 of FIG. 4), a portion of the text input describing the identified portion(s), such as, for example, a background portion (e.g., corresponding to building 211 of FIG. 2) of the single-layer image (e.g., "a Victorian era building, 1870, high quality, soft focus, f/18, 60 mm, in the style of Auguste Renoir"). In some embodiments, such extraction performed by prompt segmentation 425 may result in generating background layer text prompt 424, which may be generated by isolating textual references associated with image 216 and/or object 213 from input prompt 202. For example, background layer text prompt 424 may correspond to (e.g., "a Victorian era building, 1870, high quality, soft focus, f/18, 60 mm, in the style of Auguste Renoir") or any suitable portion thereof.

At 1116, the control circuitry inputs the extracted portion(s) of the text input to the trained text-to-image machine learning model (e.g., model 408 of FIG. 4), such as, for example, background layer text prompt 424 of FIG. 4. Based on such input, the control circuitry at 1118 may use trained machine learning model 408 to generate and output one or more images (e.g., a background image 427 of FIG. 4) based on the extracted portion(s) of the text input. In some embodiments, such background image (e.g., image 416 of FIG. 4) may be regenerated on the basis of determining that such image comprises a hole or empty region having a size that exceeds a threshold, whereas holes or empty regions for images 218 and 220 of FIG. 2 may be of a size that is below the threshold, and thus filled in via inpainting or other suitable technique at 1110.

At 1120, the control circuitry may generate a multi-layer image based on the plurality of images and the background image. For example, multi-layer image 426 may be obtained by assembling inpainted images 434, 436, and 438 into a layered image format, e.g., based on depth map 217. For example, the control circuitry may composite inpainted images (e.g., images 436 and 438) together with the one or more images (e.g., background image 427) to obtain a composite multi-layer image.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for generating a multi-layer image based on text input, the method comprising:

generating, using a first trained machine learning model and based on the text input, a single-layer image comprising a plurality of objects;

generating a plurality of masks associated with the plurality of objects;

determining a plurality of attributes associated with the plurality of objects;

generating, using a second trained machine learning model, a plurality of textual descriptions respectively corresponding to the plurality of objects;

inputting the plurality of textual descriptions generated by the second trained machine learning model to the first trained machine learning model;

generating, using the first trained machine learning model and based on the plurality of textual descriptions generated by the second trained machine learning model and the plurality of attributes, a plurality of images respectively corresponding to the plurality of textual descriptions; and generating the multi-layer image by combining the plurality of images and by using the plurality of masks, wherein the plurality of images respectively correspond to a plurality of layers of the multi-layer image.

2. The method of claim 1, wherein the second trained machine learning model comprises an image-to-text machine learning model, the plurality of images comprises a second plurality of images, and the method further comprises:

segmenting the single-layer image to generate a first plurality of images, each image of the first plurality of images comprising a depiction of a respective object of the plurality of objects of the single-layer image; and inputting the first plurality of images to the second trained machine learning model, to generate the plurality of textual descriptions respectively corresponding to the plurality of objects.

3. The method of claim 2, further comprising:

determining that, as a result of the segmenting, each respective image of the first plurality of images comprises at least one empty region at a portion of the respective image at which one of more objects of the plurality of objects is depicted in the single-layer image; and generating a mask for each respective empty region of the empty regions of the plurality of images to obtain the plurality of masks associated with the plurality of objects; and using the plurality of masks to segment, and add transparency to one or more portions of, the second plurality of images, wherein the multi-layer image is generated based at least in part on the segmented second plurality of images.

4. The method of claim 2, wherein:

determining the plurality of attributes associated with the plurality of objects comprises detecting, for each image of the first plurality of images, edges of one or more objects in the image;

inputting the plurality of textual descriptions to the first trained machine learning model comprises, for each image of the first plurality of images, inputting to the first trained machine learning model information indicative of the detected edges of the one or more objects in the image along with the corresponding textual description of the plurality of textual descriptions, wherein the generating of the second plurality of images is guided by the information indicative of the detected edges.

5. The method of claim 2, further comprising:

determining that, as a result of the segmenting, each respective image of the first plurality of images comprises at least one empty region at a portion of the respective image at which one of more objects of the plurality of objects is depicted in the single-layer image; and prior to inputting the first plurality of images to the second trained machine learning model, modifying a size or a shape of one or more empty regions of the at least one empty region.

6. The method of claim 2, further comprising:

determining that, as a result of the segmenting, each respective image of the first plurality of images comprises at least one empty region at a portion of the respective image at which one of more objects of the plurality of objects is depicted in the single-layer image;

determining whether a size of each empty region exceeds a threshold; and in response to determining that the size of each empty region exceeds the threshold, performing:

the generating of the plurality of textual descriptions respectively corresponding to the plurality of objects;

the inputting of the plurality of textual descriptions to the first trained machine learning model; and the generating of the second plurality of images respectively corresponding to the plurality of textual descriptions.

7. The method of claim 2, wherein the plurality of textual descriptions comprise a second plurality of textual descriptions, and generating, using the second trained machine learning model, the second plurality of textual descriptions respectively corresponding to the plurality of objects further comprises:

generating, using the second trained machine learning model, a first plurality of textual descriptions, based on the second trained machine learning model receiving input of the first plurality of images; and modifying the first plurality of textual descriptions based on the text input to generate the second plurality of textual descriptions.

8. The method of claim 2, wherein the second trained machine learning model comprises a large language model, and generating, using the second trained machine learning model, the plurality of textual descriptions respectively corresponding to the plurality of objects comprises:

generating, using the second trained machine learning model and based on the text input, the plurality of textual descriptions.

9. The method of claim 1, further comprising:

generating a depth map for the single-layer image, wherein the generating the multi-layer image further comprises ordering the plurality of images, respectively corresponding to the plurality of layers of the multi-layer image, based on the depth map.

10. The method of claim 1, further comprising:

receiving input of a particular image, wherein the particular image is included as an object of the plurality of objects in the generated single-layer image based on the received input of the particular image;

generating, for display at a graphical user interface, the multi-layer image, wherein the graphical user interface comprises one or more options to modify the multi-layer image;

receiving selection of the one or more options; and modifying the multi-layer image based on the received selection.

11. The method of claim 1, further comprising:

generating a plurality of variations of the multi-layer image based on the plurality of images.

12. The method of claim 11, wherein the plurality of variations comprises a first variation and a second variation, and one or more of a size, location, or appearance of a first object of the plurality of objects in the first variation is different from one or more of a size, location, or appearance of the first object in the second variation.

13. A computer-implemented system for generating a multi-layer image based on text input, the system comprising:

input/output (I/O) circuitry;

control circuitry configured to:

generate, using a first trained machine learning model and based on the text input received via the I/O circuitry, a single-layer image comprising a plurality of objects;

generate a plurality of masks associated with the plurality of objects;

determine a plurality of attributes associated with the plurality of objects;

generate, using a second trained machine learning model, a plurality of textual descriptions respectively corresponding to the plurality of objects;

input the plurality of textual descriptions generated by the second trained machine learning model to the first trained machine learning model;

generate, using the first trained machine learning model and based on the plurality of textual descriptions generated by the second trained machine learning model and the plurality of attributes, a plurality of images respectively corresponding to the plurality of textual descriptions; and generate the multi-layer image by combining the plurality of images and by using the plurality of masks, wherein the plurality of images respectively correspond to a plurality of layers of the multi-layer image.

14. The system of claim 13, wherein the second trained machine learning model comprises an image-to-text machine learning model, the plurality of images comprises a second plurality of images, and the control circuitry is further configured to:

segment the single-layer image to generate a first plurality of images, each image of the first plurality of images comprising a depiction of a respective object of the plurality of objects of the single-layer image; and input the first plurality of images to the second trained machine learning model, to generate the plurality of textual descriptions respectively corresponding to the plurality of objects.

15. The system of claim 14, wherein the control circuitry is further configured to:

determine that, as a result of the segmenting, each respective image of the first plurality of images comprises at least one empty region at a portion of the respective image at which one of more objects of the plurality of objects is depicted in the single-layer image; and generate a mask for each respective empty region of the empty regions of the plurality of images to obtain the plurality of masks associated with the plurality of objects; and use the plurality of masks to segment, and add transparency to one or more portions of, the second plurality of images, wherein the multi-layer image is generated based at least in part on the segmented second plurality of images.

16. The system of claim 14, wherein the control circuitry is configured to:

determine the plurality of attributes associated with the plurality of objects by detecting, for each image of the first plurality of images, edges of one or more objects in the image;

input the plurality of textual descriptions to the first trained machine learning model by, for each image of the first plurality of images, inputting to the first trained machine learning model information indicative of the detected edges of the one or more objects in the image along with the corresponding textual description of the plurality of textual descriptions, wherein the generating of the second plurality of images is guided by the information indicative of the detected edges.

17. The system of claim 14, wherein the control circuitry is configured to:

determine that, as a result of the segmenting, each respective image of the first plurality of images comprises at least one empty region at a portion of the respective image at which one of more objects of the plurality of objects is depicted in the single-layer image; and prior to inputting the first plurality of images to the second trained machine learning model, modify a size or a shape of one or more empty regions of the at least one empty region.

18. The system of claim 14, wherein the control circuitry is configured to:

determine that, as a result of the segmenting, each respective image of the first plurality of images comprises at least one empty region at a portion of the respective image at which one of more objects of the plurality of objects is depicted in the single-layer image;

determine whether a size of each empty region exceeds a threshold; and in response to determining that the size of each empty region exceeds the threshold, perform:

the generating of the plurality of textual descriptions respectively corresponding to the plurality of objects;

the inputting of the plurality of textual descriptions to the first trained machine learning model; and the generating of the second plurality of images respectively corresponding to the plurality of textual descriptions.

19. The system of claim 14, wherein the plurality of textual descriptions comprise a second plurality of textual descriptions, and the control circuitry is configured to generate, using the second trained machine learning model, the second plurality of textual descriptions respectively corresponding to the plurality of objects by:

generating, using the second trained machine learning model, a first plurality of textual descriptions, based on the second trained machine learning model receiving input of the first plurality of images; and modifying the first plurality of textual descriptions based on the text input to generate the second plurality of textual descriptions.

20. The system of claim 14, wherein the second trained machine learning model comprises a large language model, and the control circuitry is configured to generate, using the second trained machine learning model, the plurality of textual descriptions respectively corresponding to the plurality of objects by:

generating, using the second trained machine learning model and based on the text input, the plurality of textual descriptions.

* * * * *